(12) United States Patent
George et al.

(10) Patent No.: US 12,483,762 B2
(45) Date of Patent: Nov. 25, 2025

(54) SECURITY FOR CONTENT DELIVERY DURING VEHICLE CHARGING

(71) Applicant: TOYOTA MOTOR NORTH AMERICA, INC., Plano, TX (US)

(72) Inventors: James J. George, Frisco, TX (US); James D. Wilder, Dallas, TX (US); Christopher E. Yang, Frisco, TX (US)

(73) Assignees: TOYOTA MOTOR NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/443,032

(22) Filed: Feb. 15, 2024

(65) Prior Publication Data

US 2025/0267343 A1 Aug. 21, 2025

(51) Int. Cl.
*H04N 21/81* (2011.01)
*B60L 53/66* (2019.01)
*H04N 21/414* (2011.01)

(52) U.S. Cl.
CPC ............ *H04N 21/814* (2013.01); *B60L 53/66* (2019.02); *H04N 21/41422* (2013.01)

(58) Field of Classification Search
CPC . H04N 21/814; H04N 21/41422; B60L 53/66
See application file for complete search history.

(56) References Cited

U.S. PATENT DOCUMENTS

| | | | |
|---|---|---|---|
| 10,160,457 B1 * | 12/2018 | O'Flaherty | G08B 21/06 |
| 10,414,376 B1 | 9/2019 | Ghannam et al. | |
| 10,882,538 B1 * | 1/2021 | Witt | G01S 7/6272 |
| 11,007,979 B1 * | 5/2021 | Mitchell | B60R 25/33 |
| 11,027,686 B2 | 6/2021 | Kline et al. | |
| 11,164,010 B2 * | 11/2021 | Turk | G06V 40/10 |
| 11,295,598 B2 | 4/2022 | Hedges et al. | |
| 11,987,256 B1 * | 5/2024 | Gingrich | G06Q 10/20 |
| 2019/0294881 A1 * | 9/2019 | Polak | G06V 10/454 |
| 2021/0188162 A1 * | 6/2021 | Yoshizawa | B60W 50/16 |
| 2022/0189282 A1 | 6/2022 | Hedges et al. | |
| 2023/0264593 A1 | 8/2023 | Jasti | |
| 2023/0384105 A1 * | 11/2023 | Hu | B60L 50/60 |
| 2024/0005788 A1 * | 1/2024 | Williams | G08G 1/0969 |
| 2024/0101128 A1 * | 3/2024 | Bradley | B60W 50/0097 |
| 2024/0190289 A1 * | 6/2024 | Bove, Jr. | H04N 21/41422 |
| 2024/0196038 A1 * | 6/2024 | Bove, Jr. | H04N 21/41422 |

(Continued)

FOREIGN PATENT DOCUMENTS

| | | | | |
|---|---|---|---|---|
| CN | 107323421 A | | 11/2017 | |
| CN | 115966056 A | * | 4/2023 | |
| CN | 117132038 A | * | 11/2023 | ......... G01C 21/3469 |

(Continued)

OTHER PUBLICATIONS

Armstrong, Tesla Sentry Mode: What it is, how to use it and battery drain, Apr. 5, 2023, https://www.notateslaapp.com/tesla-reference/1303/tesla-sentry-mode-what-it-is-how-to-use-it-and-battery-drain.

*Primary Examiner* — Ricky Chin

(57) ABSTRACT

An example operation includes one or more of determining a vehicle is receiving content while connected to a charging point, and providing an alert when an adverse situation arises within a proximity threshold of the vehicle while an occupant is consuming the content.

17 Claims, 25 Drawing Sheets

(56) References Cited

U.S. PATENT DOCUMENTS

2024/0404296 A1\* 12/2024 Sah .................. G06V 20/58

FOREIGN PATENT DOCUMENTS

| CN | 118553067 A | \* | 8/2024 | | |
|----|-------------|---|--------|---|---|
| EP | 3287331 A1 | | 2/2018 | | |
| KR | 2021036178 A | \* | 4/2021 | ............. | B60L 53/11 |
| WO | WO-2023168173 A1 | \* | 9/2023 | ............. | G06Q 50/06 |
| WO | WO-2024124230 A1 | \* | 6/2024 | ............. | B60K 35/28 |

\* cited by examiner

SECURITY FOR CONTENT DELIVERY DURING VEHICLE CHARGING

BACKGROUND

Vehicles or transports, such as cars, motorcycles, trucks, planes, trains, etc., generally provide transportation needs to occupants and/or goods in a variety of ways. Functions related to vehicles may be identified and utilized by various computing devices, such as a smartphone or a computer located on and/or off the vehicle.

SUMMARY

One example embodiment provides a method that includes one or more of determining a vehicle is receiving content while connected to a charging point, and providing an alert when an adverse situation arises within a proximity threshold of the vehicle while an occupant is consuming the content.

Another example embodiment provides a system that includes a memory communicably coupled to a processor, wherein the processor performs one or more of determines, by the vehicle, the vehicle receives content while connected to a charging point, and provides, by the vehicle, an alert when an adverse situation arises within a proximity threshold of the vehicle while an occupant consumes the content.

A further example embodiment provides a computer-readable storage medium comprising instructions, that when read by a processor, cause the processor to perform one or more of determining a vehicle is receiving content while connected to a charging point, and providing an alert when an adverse situation arises within a proximity threshold of the vehicle while an occupant is consuming the content.

DETAILED DESCRIPTION

Figure 1A:
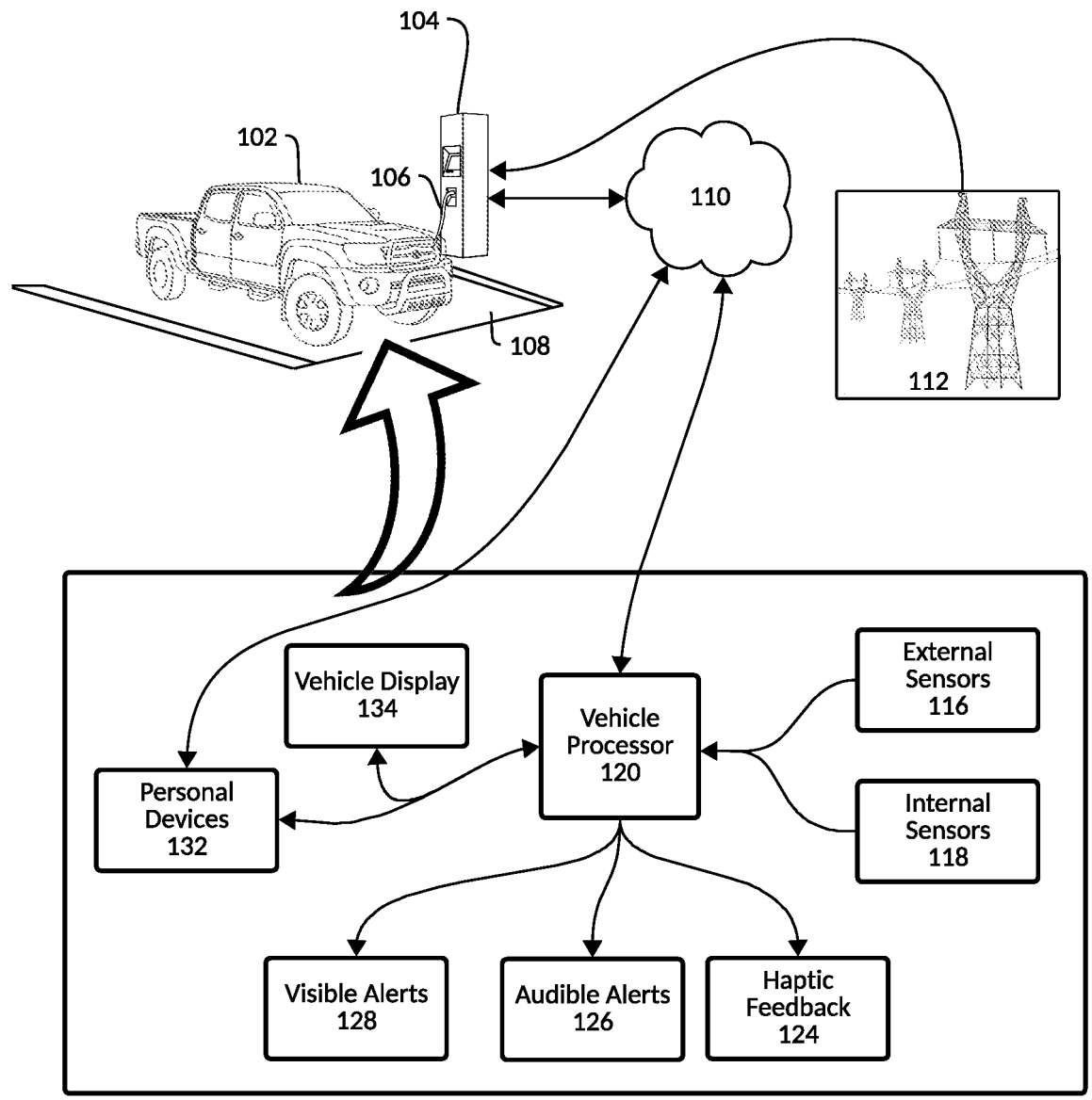
FIG. 1A illustrates an example system diagram, according to example embodiments.

It will be readily understood that the instant components, as generally described and illustrated in the figures herein, may be arranged and designed in a wide variety of different configurations. Thus, the following detailed description of the embodiments of at least one of a method, apparatus, computer-readable storage medium and system, as represented in the attached figures, is not intended to limit the scope of the application as claimed but is merely representative of selected embodiments. Multiple embodiments depicted herein are not intended to limit the scope of the solution. The computer-readable storage medium may be a non-transitory computer-readable medium or a non-transitory computer-readable storage medium.

Communications between the vehicle(s) and certain entities, such as remote servers, other vehicles and local computing devices (e.g., smartphones, personal computers, vehicle-embedded computers, etc.) may be sent and/or received and processed by one or more 'components' which may be hardware, firmware, software, or a combination thereof. The components may be part of any of these entities or computing devices or certain other computing devices. In one example, consensus decisions related to blockchain transactions may be performed by one or more computing devices or components (which may be any element described and/or depicted herein) associated with the vehicle(s) and one or more of the components outside or at a remote location from the vehicle(s).

The instant features, structures, or characteristics described in this specification may be combined in any suitable manner in one or more embodiments. For example, the usage of the phrases "example embodiments," "some embodiments,", "a first embodiment", or other similar language throughout this specification refers to the fact that a particular feature, structure, or characteristic described in connection with the one or more embodiments may be included in one or more other embodiments described or depicted herein. Thus, the one or more embodiments, described or depicted throughout this specification can all refer to the same embodiment. Thus, these embodiments may work in conjunction with any of the other embodiments, may not be functionally separate, and the described features, structures, or characteristics may be combined in any suitable manner in one or more embodiments. Although described in a particular manner, by example only, or more feature(s), element(s), and step(s) described herein may be utilized together and in various combinations, without exclusivity, unless expressly indicated otherwise herein. In the figures, any connection between elements can permit one-way and/or two-way communication, even if the depicted connection is a one-way or two-way connection, such as an arrow.

In the instant solution, a vehicle may include one or more of cars, trucks, Internal Combustion Engine (ICE) vehicles, battery electric vehicle (BEV), fuel cell vehicles, any vehicle utilizing renewable sources, hybrid vehicles, e-Palettes, buses, motorcycles, scooters, bicycles, boats, recreational vehicles, planes, drones, Unmanned Aerial Vehicle (UAV) and any object that may be used to transport people and/or goods from one location to another.

In addition, while the term "message" may have been used in the description of embodiments, other types of network data, such as, a packet, frame, datagram, etc. may also be used. Furthermore, while certain types of messages and signaling may be depicted in exemplary embodiments they are not limited to a certain type of message and signaling.

Example embodiments provide methods, systems, components, non-transitory computer-readable medium, devices, and/or networks, which provide at least one of a transport (also referred to as a vehicle or car herein), a data collection system, a data monitoring system, a verification system, an authorization system, and a vehicle data distribution system. The vehicle status condition data received in the form of communication messages, such as wireless data network communications and/or wired communication messages, may be processed to identify vehicle status conditions and provide feedback on the condition and/or changes of a vehicle. In one example, a user profile may be applied to a particular vehicle to authorize a current vehicle event, service stops at service stations, to authorize subsequent vehicle rental services, and enable vehicle-to-vehicle communications.

Within the communication infrastructure, a decentralized database is a distributed storage system which includes multiple nodes that communicate with each other. A blockchain is an example of a decentralized database, which includes an append-only immutable data structure (i.e., a distributed ledger) capable of maintaining records between untrusted parties. The untrusted parties are referred to herein as peers, nodes, or peer nodes. Each peer maintains a copy of the database records, and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In public or permissionless blockchains, anyone can participate without a specific identity. Public blockchains can involve cryptocurrencies and use consensus-based on various protocols such as proof of work (PoW). Conversely, a permissioned blockchain database can secure interactions among a group of entities, which share a common goal, but which do not or cannot fully trust one another, such as businesses that exchange funds, goods, information, and the like. The instant solution can function in a permissioned and/or a permissionless blockchain setting.

Smart contracts are trusted distributed applications which leverage tamper-proof properties of the shared or distributed ledger (which may be in the form of a blockchain) and an underlying agreement between member nodes, which is referred to as an endorsement or endorsement policy. In general, blockchain entries are "endorsed" before being committed to the blockchain while entries which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol produces an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node, which submits an entry-invocation to an endorser (e.g., peer), and broadcasts entry proposals to an ordering service (e.g., ordering node). Another type of node is a peer node, which can receive client submitted entries, commit the entries, and maintain a state and a copy of the ledger of blockchain entries. Peers can also have the role of an endorser. An ordering-service-node or orderer is a node running the communication service for all nodes and which implements a delivery guarantee, such as a broadcast to each of the peer nodes in the system when committing entries and modifying a world state of the blockchain. The world state can constitute the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which stores an immutable, sequenced record in blocks. The ledger also includes a state database, which maintains a current state of the blockchain. There is typically one ledger per channel. Each peer node maintains a copy of the ledger for each channel of which they are a member.

A chain is an entry log structured as hash-linked blocks, and each block contains a sequence of N entries where N is equal to or greater than one. The block header includes a hash of the blocks' entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Since the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log and can therefore be regenerated from the chain at any time. The state database may automatically be recovered (or generated if needed) upon peer node startup and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a service to a particular vehicle and/or a user profile that is applied to the vehicle. For example, a user may be the owner of a vehicle or the operator of a vehicle owned by another party. The vehicle may require service at certain intervals, and the service needs may require authorization before permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more vehicle and/or road sensors or cameras, which report sensed data to a central controller computer device in and/or apart from the vehicle. This data is forwarded to a management server for review and action. A sensor may be located on one or more of the interior of the vehicle, the exterior of the vehicle, on a fixed object apart from the vehicle, and on another vehicle proximate the vehicle. The sensor may also be associated with the vehicle's speed, the vehicle's braking, the vehicle's acceleration, fuel levels, service needs, the gear-shifting of the vehicle, the vehicle's steering, and the like. A sensor, as described herein, may also be a device, such as a wireless device in and/or proximate to the vehicle. Also, sensor information may be used to identify whether the vehicle is operating safely and whether an occupant has engaged in any unexpected vehicle conditions, such as during a vehicle access and/or utilization period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., owner, user, company, agency, etc.) may want to limit the exposure of private information, and therefore the blockchain and its immutability can be used to manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a consensus approach associated with the blockchain. Such an approach may not be implemented on a traditional centralized database.

Various driving systems of the instant solution can utilize software, an array of sensors as well as machine learning functionality, light detection and ranging (Lidar) projectors, radar, ultrasonic sensors, etc. to create a map of terrain and road that a vehicle can use for navigation and other purposes. In some embodiments, global positioning system (GPS), maps, cameras, sensors, and the like can also be used in autonomous vehicles in place of Lidar.

The instant solution includes, in certain embodiments, authorizing a vehicle for service via an automated and quick authentication scheme. For example, driving up to a charging station or fuel pump may be performed by a vehicle operator or an autonomous vehicle and the authorization to receive charge or fuel may be performed without any delays provided the authorization is received by the service and/or charging station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the vehicle and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record. A blockchain may be used for storing vehicle-related data and transactions.

Any of the actions described herein may be performed by one or more processors (such as a microprocessor, a sensor, an Electronic Control Unit (ECU), a head unit, and the like), with or without memory, which may be located on-board the vehicle and/or off-board the vehicle (such as a server, computer, mobile/wireless device, etc.). The one or more processors may communicate with other memory and/or other processors on-board or off-board other vehicles to utilize data being sent by and/or to the vehicle. The one or more processors and the other processors can send data, receive data, and utilize this data to perform one or more of the actions described or depicted herein.

According to example embodiments, FIG. 1A is a system diagram 100 of security for content delivery during vehicle charging. An electric vehicle (EV) 102 is the central node with connections to various subsystems and includes a charging port, a component on the EV for receiving and sending electrical charge. A charging cable/connector 106 connects from the charging station/point 104 to the EV. A charging station/point 104 is a device that allows electricity to be delivered and/or received from the EV. A charging bay 108 is a parking location with a proximate charging station/point where a vehicle can park and connect to the charging station/point to receive and/or send electricity. The charging station/point 104 is connected to a grid/energy provider 112 and a network/cloud 110. The external sensors 116 and internal sensors 118, alerting mechanisms (including haptic feedback 124, audible alerts 126, and visible alerts 128), vehicle processor 120, and devices such as personal devices 132 and vehicle display 134 are part of vehicle 102. External sensors 116 may include one or more of cameras, radar, LIDAR, microphones, etc., placed around the perimeter of the EV, each connected to the vehicle's processor. The internal sensors 118, such as cameras, microphones, etc., are sensors within the vehicle cabin that detect occupant presence and attention. Data collected from the sensors may be sent to the vehicle processor 120 for processing. The alerting mechanisms may include haptic feedback 124, such as vibrating seats or steering wheels, audible alerts 126 such as through speakers placed in the cabin of the vehicle, and visible 128 alerts, which may include data presented on displays in the vehicle, heads-up units as well as displays associated with the infotainment system of the vehicle. The content delivery subsystem may include personal devices 132 associated with vehicle occupants, such as mobile devices, laptops, tablets, wearable computers, etc. Content delivery may include a display in the vehicle, which may be part of the infotainment and may include more than one display. These displays may be screens inside the vehicle that receive and display content. Visible alerts 128 may also be included in the content delivery, including blinking/flashing lights, the content presented on a display associated with the vehicle, etc. The external sensors 116 and internal sensors 118, alerting mechanisms such as haptic feedback 124, audible alerts 126 and visible alerts 128 may be coupled with the vehicle processor 120. The personal devices 132 and vehicle display 134 may be coupled to the vehicle processor 120. The vehicle processor 120 may communicate with the network/cloud 110 through wireless communication. The network/cloud 110 may include servers that communicate and may be referred to as the cloud or Internet in some embodiments.

The instant solution pertains to a security and alert system for an EV 102 while charging at a charging station/point 104. One objective of the system is to alert EV occupants who may be distracted by consuming media content, thus ensuring their safety and the security of the vehicle and its surroundings. This system utilizes a range of external sensors 116 and internal sensors 118, such as cameras, microphones, radar, and LIDAR, to monitor the environment around the vehicle. These sensors detect the presence of persons or objects in proximity to the vehicle, particularly when it is parked and charging. The vehicle may enter a state, such as a Proximity Alert Mode (PAM), when it is determined that the occupant may be unable to determine a dangerous situation due to being focused on the content inside the vehicle. In this mode, the external sensors 116 and internal sensors 118 may actively monitor the surroundings and notify the vehicle processor 120 about potential threats or unusual activities near the vehicle. The haptic feedback 124, audible alerts 126, and visible alerts 128 can provide visual, audible, and haptic warnings inside the cabin. For example, the vehicle's seats or steering wheel might vibrate to alert the occupant. This system is particularly crucial when the EV owner or occupants are focused on media content, as their attention is diverted from their surroundings.

When multiple occupants are present, each can consume different content, individually tracked and transferred to and from their devices as they enter and exit the vehicle. The content is displayed on the screens nearest each occupant inside the vehicle. The system can receive content from a server at the charging station/point 104, a remote server, and/or directly from the charging infrastructure. Where multiple occupants are present within an EV 102, the content consumption and transfer system are designed to cater to the individual media preferences of each occupant through a network of interconnected components within the vehicle's ecosystem. Each occupant's mobile device is paired with the vehicle processor 120, the central hub for content management and distribution. The processor communicates with a content server that streams media to the vehicle. This content server may be part of the EV's manufacturer's cloud services or a third-party media provider.

When each occupant consumes content on their personal device 132 or the vehicle's display 134, the system keeps track of the content being viewed through a unique identifier associated with each user's profile. This ensures that the content delivery is personalized and continuous, even as occupants move in and out of the vehicle. The vehicle processor 120 utilizes sensors 152 to determine the seating position of each occupant, enabling the system to display the content on the nearest screen to them. This involves communication between seat sensors, occupant detection systems, and the display controllers to ensure that the right content is displayed on the correct screen. As an occupant exits vehicle 102, a message is sent from vehicle processor 120 to content server, indicating that the content streaming to that occupant's nearest display should now be transferred to their personal device 132. The content server then streams the content to the personal device, ensuring that the occupant can continue their experience uninterrupted. The reverse process occurs when the occupant re-enters the vehicle; the onboard processor detects their presence through internal sensors and communicates with the server to resume content streaming to the nearest display.

In certain embodiments, the system can control the vehicle's 102 cameras to optimize surveillance, such as pivoting or zooming for a better view or utilizing multiple cameras for comprehensive coverage. This functionality is particularly useful in detecting and responding to events affecting the charging process or the vehicle's and its occupants' safety. For example, when a person approaches the charging bay or point, the system can alert the occupant, especially if the person lingers beyond a predefined threshold. The system can also detect issues with the charging apparatus or other abnormal situations near charging station 104. When the system enters a heightened alert state, such as the PAM, it activates specific surveillance protocols to assess potential threats. The vehicle's external sensors 116, such as cameras, equipped with capabilities such as pan, tilt, and zoom (PTZ), can be dynamically controlled by the vehicle processor 120. For example, if a sensor, like LIDAR or radar, detects an object or individual approaching the vehicle, the processor can command the nearest camera to pivot towards the detected presence and zoom in to acquire a more detailed view, enhancing the quality of information gathered about the potential threat. The vehicle's 102 multiple cameras can be orchestrated to work in unison to provide comprehensive coverage. The vehicle processor 120, utilizing data from the external sensors 116, can determine which cameras should be activated and how they should be positioned to create a seamless panoramic view around the EV. This may involve cameras on different sides of the vehicle synchronizing their movements to track an object as it moves around the EV, ensuring continuous monitoring. The system's software analyzes the real-time video feeds to detect unusual patterns or behaviors, such as lingering individuals or tampering with the vehicle's charging port. Upon such detections, the processor can adjust the cameras' focus, angle, and zoom to closely monitor these activities and record high-resolution footage for further analysis or evidence.

The process begins when an EV 102 arrives at a charging station or charging bay 108 and connects to it via the charging station/point 104 using a charging cable or connector 106. The charging station/point 104 receives energy from a grid/energy provider 112. Once the charging process starts, the content delivery system is initiated.

The connection of the EV 102 to the charging cable or connector 106 triggers the vehicle's onboard processor to establish a session with the content server, which is a server (not depicted) that is connected to network/cloud 110, indicating that the vehicle is in a stationary and secure state, suitable for media consumption. The vehicle processor 120, which oversees the infotainment system, sends a signal to the content server through a secured wireless connection such as Wi-Fi or cellular data. This signal includes an authentication request, confirming that the vehicle is eligible to access the content library. The server, upon validating the credentials and the status of the vehicle, responds with an acknowledgment message, thus establishing a two-way communication channel.

The vehicle processor 120 communicates with the vehicle's internal network to check the status of onboard systems and occupants. It sends a message to the internal sensors 118 to ascertain the number and position of occupants within the vehicle. A content availability message is transmitted from the server to the vehicle's processor, providing a catalog or list of available content or resuming previously selected content that occupants were engaged with before the vehicle was parked. Occupants can select the content they wish to consume through their personal devices or the vehicle's interface. Once the selections are made, the vehicle processor sends content request messages to the server for each selection. The server processes these requests and begins streaming the content, sending it in data packets to the vehicle's processor. The processor then decodes these packets and distributes the content to the appropriate display screens within the vehicle's cabin, ensuring that each occupant receives their chosen media. When new occupants enter the vehicle or existing occupants wish to change their content selection, the processor manages these transitions by sending update messages to the server, which responds by adjusting the content streams as required.

Personal devices 132 of the occupants, such as smartphones or tablets, establish a two-way connection with the vehicle processor 120 via a wireless connection (e.g., Bluetooth). This connection enables transferring content—such as media or interactive applications—from these personal devices to the vehicle's display 134. Content can also be sourced from external servers or network/cloud 110, providing a wide range of media for consumption. The sensor subsystem of the vehicle, which may include cameras, radar, LIDAR, and microphones placed around the perimeter of the EV, starts monitoring the surrounding environment. Internal sensors 118 within the vehicle cabin detect the presence and attention of the occupants. These sensors feed data to the vehicle processor 120. The vehicle processor may have separate nodes for different processing tasks, such as image processing or threat assessment. When the vehicle processor 120, through the data received from the sensor subsystem, detects an adverse situation or potential threat within a proximity threshold of the vehicle, it activates one or more haptic feedback 124, audible alerts 126, or visible alerts 128. These mechanisms include haptic feedback 124 like vibrating seats or steering wheels, audible alerts 126 through speakers, and visual alerts 128 on the vehicle's display screens or heads-up display (HUD). These alerts are designed to draw the occupants' attention, ensuring their awareness of the situation outside despite being engaged in content consumption. Network connectivity facilitates communication between vehicles 102, personal devices 132, and external servers/cloud 110.

In one embodiment, the vehicle may enter a mode, such as a PAM. This mode allows the system to respond to specific triggers (such as movement or the presence of unknown individuals near the vehicle).

Figure 1B:
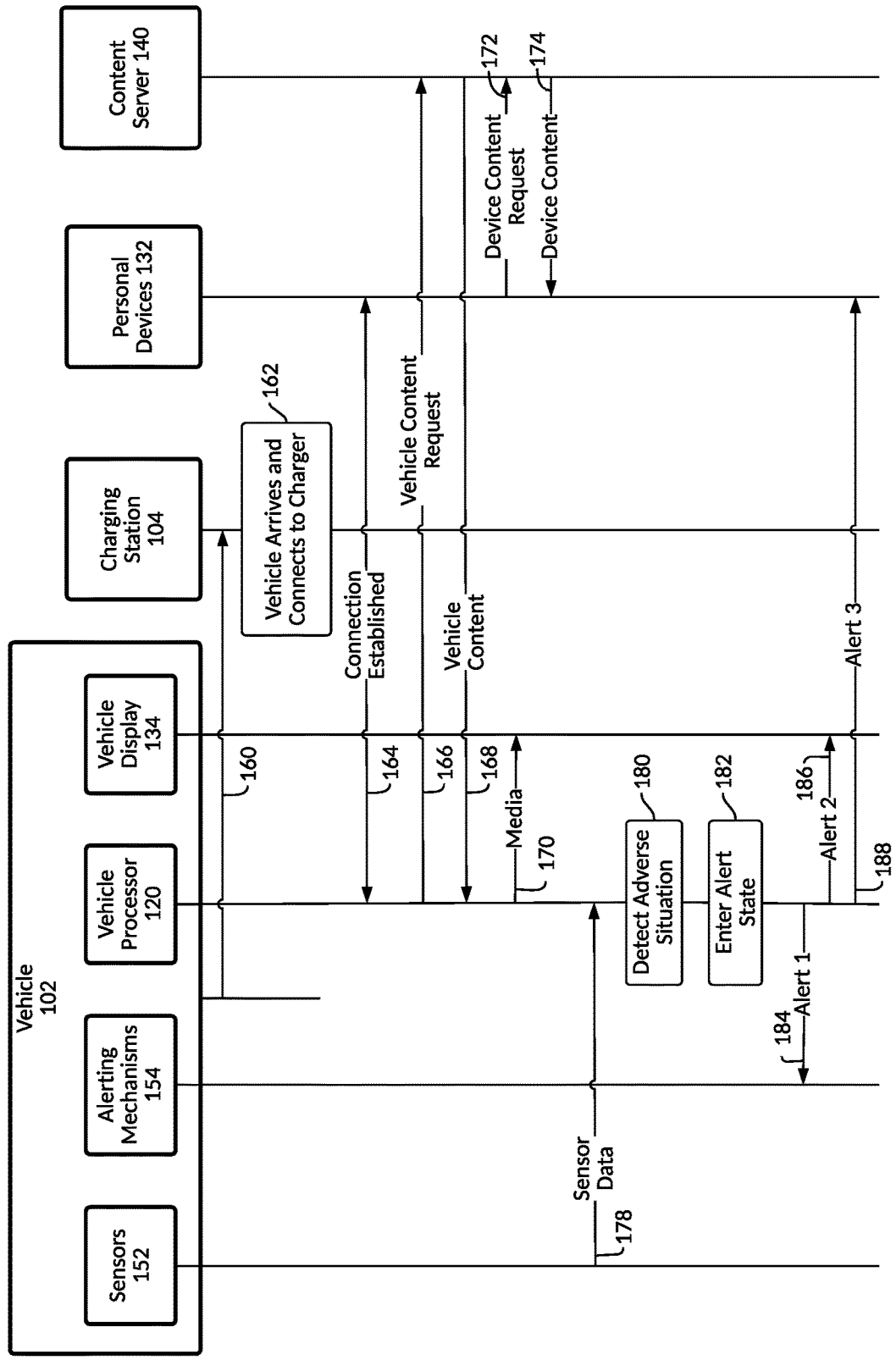
FIG. 1B illustrates a further flowchart, according to example embodiments.

FIG. 1B shows a flowchart 150 of security during content delivery when a vehicle is charging, according to example embodiments. The EV 102 arrives at a charging bay of charging station 104. The EV connects 160 to the charging station using the charging cable/connector, and the charging process initiates 162. Personal devices 132 of the occupants have a previous connection or establish a connection 164 with the vehicle processor 120 through a wired connection (e.g., a connection cable) or wireless connection, such as via Bluetooth. Content may begin to be sent to one or more of the vehicle 102 or personal devices 132 associated with occupants of the vehicle. The content may be sent from charging station 104 but from a content server 140 that may be communicatively coupled to the network/cloud 110 and/or the charging station 104. In one example, the vehicle sends a message to the content server 140, such as a vehicle content request 166 message. The content server 140 where the content resides may be located beyond the network/cloud 110 and is not depicted. A response message is returned 168, containing the content sent 170 to the vehicle display 134 for consumption. In another embodiment, the personal devices 132 (associated with occupants of vehicle 102) may initiate the process by sending a device content request message 172, then receiving a device content message 174, containing the content to be consumed by the occupants of the personal device 132.

Sensors 152 on the vehicle 102 send sensor data 178 to the vehicle processor 120. The sensors may include cameras, such as those mounted on the vehicle's exterior. Other sensors, such as radars and microphones, may also be present. The instant solution executes partially or fully on a processor such as vehicle processor 120. The vehicle may analyze the received sensor data to determine that an adverse situation has arisen or is predicted to arise 180.

The sensors 152, which may include cameras, radar, LIDAR, and microphones, are strategically placed around the vehicle's 102 perimeter to capture a wide range of data about the vehicle's external environment. The sensors relay data to the vehicle's processor. This data transmission includes raw sensor feeds, subject to real-time analysis by the processor's software. This functionality is designed to identify patterns, movements, or signals that deviate from the baseline of a normal, safe environment. For example, a camera may detect an unknown individual loitering near the vehicle's charging port, or the microphone may pick up the sounds of unusual activity or tampering near the vehicle. Upon receiving such sensor data, the processor initiates a risk assessment protocol. It involves cross-referencing the input from various sensors to reduce false positives and confirm the potential threat. For example, if the radar and camera data correlate on an unexpected presence near the vehicle, the processor increases the threat level. Once the vehicle processor determines a potential adverse situation, it sends an alert message to its user interface system. This message activates the alerting mechanisms, such as audible alarms, visible alerts on the dashboard or infotainment screen, and haptic feedback mechanisms, such as vibrating seats or steering wheels. Each alert is tailored to the nature and urgency of the situation, ensuring that the occupants are adequately informed and can take appropriate action. The processor may log the event and send a message to a remote server or security service, especially if the situation is serious. This message can include details of the situation and, if necessary, a request for external intervention. The vehicle processor may engage the vehicle's communication system to send a distress signal to nearby devices or authorities, providing the vehicle's location and the nature of the adverse situation.

In one embodiment, sensors 152 may detect a person approaching the vehicle with an object in their hands, indicating an attempted entry. Object detection, performed by the received sensor data, may be utilized by the vehicle processor 120. The alert may be issued before the person has time to damage the vehicle. In an alternate embodiment, extra light is turned on providing light to the area where the vehicle is located. The vehicle or server executing fully or partially the instant solution sends a notification to the charging station wherein the lights are enabled in that area.

The alert can be in the form of various media (image, video, audio, text) and provide information about the adverse information such as a type, a location, action(s) to take by one or more of the occupants, action(s) to take by the vehicle (semi-autonomous or fully autonomous).

Responsive to the adverse situation, an alert state is entered 182, such as a PAM. In this mode, functionality may be performed by the vehicle. For example, the data received from the sensors is analyzed more often than normal. Additionally, different elements of external cameras on the vehicle may be engaged, such as zoom and capturing various angles. Alerts may be sent 184 via the vehicle processor 120 to one or more alerting mechanisms 154 of the vehicle where the occupants are alerted to the adverse situation via haptic feedback devices (e.g., vibrating seats/steering wheel), audible alerts through speakers and/or visual alerts on display screens or HUD. An alert may also be sent 186 to the vehicle display 134 of the vehicle to be presented. The system may offer additional information or instructions on the display screens. An alert may also be sent 188 to the personal devices 132. As occupants respond to alerts, the content delivery system manages media display. When occupants exit and re-enter the vehicle, the system resumes content display seamlessly. The system continuously monitors the charging process and the environment. It adjusts the surveillance strategy (e.g., camera angles) as needed. Once charging is complete, the system disengages the heightened monitoring modes. The vehicle prepares for normal operation, resetting the security and content systems.

In one embodiment, the system also features a dynamic content transfer functionality. When an occupant consumes content within the vehicle via the vehicle's infotainment system or a display integrated into the vehicle, the vehicle processor 120 is connected to the vehicle's display systems and the occupant's personal devices through a wireless communication protocol, such as Bluetooth or Wi-Fi. As the occupant decides to exit the vehicle, the system detects this action through a combination of internal sensors within the vehicle that monitor the presence and movement of occupants and a signal from the occupant's mobile device indicating its separation from the vehicle. Upon detecting the occupant's intention to leave or actual departure, the vehicle processor 120 initiates a seamless transition of content delivery from the vehicle's display system to the occupant's personal device 132. This involves sending a message from the vehicle's processor to a content server 140, requesting the redirection of content streaming to the mobile device. The content server 140, which hosts or has access to the consumed content, acknowledges this request and establishes a connection to the mobile device, using its unique identification to ensure content continuity. The content server then begins streaming the content directly to the mobile device, allowing the occupant to continue their experience without interruption.

When the occupant returns to the vehicle, a reverse process is initiated. The vehicle's internal sensors and the mobile device communicate the occupant's return to the vehicle's processor. A message from the vehicle processor 120 to the content server 140 indicates that content streaming should be returned to the vehicle's display system. The server adjusts the content delivery to ensure that the content the occupant consumed on their mobile device is now seamlessly displayed on the vehicle's system. Throughout this process, the content server acts as a pivot, dynamically adjusting the content stream based on the location of the content consumption-inside the vehicle or on the occupant's mobile device, thereby ensuring a fluid and uninterrupted media consumption experience for the vehicle's occupants.

In one embodiment, the adverse situation includes a probability greater than a threshold of damage to vehicle 102 or an attempted entry into the vehicle. The system utilizes a set of sensors 152 strategically placed around the vehicle to monitor its surroundings. These sensors may include cameras, radar, LIDAR, and microphones, each capable of detecting the presence of objects or individuals near the vehicle and signs of potential damage or tampering. The sensors collect data and send it to the vehicle processor 120. The vehicle processor, equipped with the full or partial content of the instant solution, contains software capable of analyzing the sensor data and assessing the probability of a threat. For example, when the camera feeds or radar signals detect unusual movement near the vehicle, like a person with a tool near the charging port, the processor's software may determine whether these observations exceed the predefined threat threshold.

The processor triggers an alert when the threat level is above the threshold. This may involve sending a signal to the vehicle's user interface to initiate an alert-visually on the display screens, audibly through the vehicle's speakers, or through haptic feedback mechanisms like the steering wheel's or seats' vibration. Vehicle processor 120 may send a message to content server 140. The server logs the event, sends additional notifications to predefined contacts or emergency services, and activates external safety measures, such as additional lighting around the charging point to deter the threat or provide better visibility for cameras. The server communicates with the content server 140 to pause or alter the content provided to the vehicle's occupants, ensuring they know the situation. This content management may involve the content server 140 sending commands back to the vehicle processor 120, which in turn communicates with the vehicle's infotainment system to pause or lower the content volume, allowing the alert(s) to take precedence.

The vehicle processor 120 interfaces with the vehicle's sensors 152 and the vehicle display 134 that delivers content to the occupants. When an occupant is consuming content, the vehicle processor is aware of the current state of media playback, whether audio or video and knows which devices or displays are used for content consumption. Upon detecting a potentially adverse situation via sensors 152, like cameras, radar, LIDAR, and microphones, the instant solution executing fully or partially on the vehicle processor assesses the threat level. If a threat is detected and the system decides to issue an alert, the vehicle processor sends a command to pause the content. In one embodiment, this can be implemented via a direct message to the infotainment control software, which then executes the command to halt media playback across the relevant outputs, such as the vehicle display 134 or connected personal devices 132. The vehicle processor may signal to the alerting mechanisms 154 of the vehicle, such as the vehicle display 134, audio outputs, or haptic feedback devices, to convey the alert to the occupants. This ensures that the occupants' attention is redirected from the content to the alert. The interruption of the content also acts as a significant part of the alerting process, signaling to the occupants that a situation requires their attention. When the content is being consumed through personal devices using headphones, the vehicle processor 120 may communicate with these devices directly via a wireless connection, like Bluetooth, to pause the content. This may be accomplished by the processor sending a pause command to the personal device's media player application.

Sensors 152 are connected to the vehicle processor 120, which analyzes the received 178 sensor data to detect potential adverse situations, such as someone attempting to enter the vehicle or a scenario that might damage the vehicle. When the vehicle processor identifies such a situation, it determines the nature and severity of the threat. If the threat surpasses a predetermined threshold, the processor activates the vehicle's communication module (not depicted). This module can reach out to pre-set contacts, including the vehicle owner's personal device 132, emergency services, or the vehicle manufacturer's security monitoring service. The communication module sends a notification that may include various forms of media, such as images from the external cameras showing the situation outside the vehicle, audio clips captured by microphones, or a text description generated by the vehicle processor. The module can also include the vehicle's precise location, using the vehicle's GPS. This information package is sent via cellular, Wi-Fi, or any other available wireless communication network to the designated recipient. The vehicle's processor may interface with the charging station 104. It sends a command to the charging station to activate extra lighting in the area, which can deter potential threats and provide better visibility for the vehicle's cameras. For direct communication with emergency services, the vehicle's communication system may utilize a dedicated emergency communication protocol specifically designed for vehicles to automatically dial emergency services in case of a serious accident. In the case of contacting a personal contact like a spouse, the vehicle's system might interface with the user's smartphone, either through a direct communication link or via a cloud service provided by the vehicle manufacturer.

When vehicle processor 120 determines that the occupant may not be aware of the alert due to the volume of the audio content, it sends a command to the infotainment system to lower the volume. This command may be communicated directly to the vehicle's infotainment system if the content is being played through the vehicle's speakers or display systems. The infotainment system may receive the command and execute a volume reduction, allowing the alert to be heard. In cases where the occupant uses a personal device 132 with headphones, the vehicle processor may communicate with the personal device through a wireless protocol such as Bluetooth or Wi-Fi. The processor may send a command to the personal device's operating system or specific application controlling the media playback to lower the volume or pause the content, thereby facilitating the occupant's recognition of the external alert. The vehicle processor may also be programmed to consider the context of the situation, such as whether the vehicle is stationary or in motion, and the nature of the consumed content, to determine the degree of volume reduction needed. For example, if the content involves active participation from the occupant, such as a video call or interactive game, the system may pause the content entirely rather than just lowering the volume. The instant solution includes a feedback mechanism to confirm that the volume has been lowered and that the occupant has acknowledged the alert. This involves sensors inside vehicle 102 that monitor the occupant's reactions or an interface that requires the occupant to confirm receipt of the alert.

In one embodiment, the instant solution controls how content is distributed within the vehicle, whether streamed to the vehicle display 134 or the occupant's personal devices 132. The vehicle processor 120 is connected to the vehicle's internal network and can communicate with various devices and displays via wired or wireless connections, such as high-definition multimedia interface (HDMI), universal serial bus (USB), Bluetooth, or Wi-Fi. Vehicle 102 has sensors 152, such as cameras, radars, and microphones, which monitor the vehicle's surroundings. These sensors are designed to detect potential adverse situations, like a person loitering suspiciously near the vehicle or unusual movements that may indicate an attempted break-in or damage to the vehicle. When the processor identifies a threat that warrants an alert, it will initiate a protocol to manage the content delivery per the nature of the alert. When the content is being displayed on the vehicle's screens, and an alert needs to be issued, the processor will send a command to the infotainment system to display the alert on the screen, potentially interrupting or overlaying the content that is currently being shown. When the content is consumed on the occupant's personal device, the vehicle processor 120 sends a signal to that device, likely via Bluetooth or another wireless communication, to trigger an alert through the device's operating system or a specific application. This may result in a pause of the content, a reduced volume, or a notification on the device. The vehicle processor manages these commands and ensures that the appropriate response is executed depending on where the content is received. It is configured to recognize whether the occupant is engaged with the vehicle's infotainment system or a personal device and adjusts the delivery of the alert accordingly. It may also send different types of alerts through different channels. For example, an audible alert through the vehicle's speaker system and a visual alert on the currently used display for content consumption.

In one embodiment, the sensors 152 are linked to the vehicle processor 120, which is programmed with functionality capable of assessing the severity of detected situations. The vehicle processor evaluates sensor data against predefined criteria to ascertain the level of risk and determine if it meets or exceeds certain threat thresholds. Upon identifying a situation as adverse, the vehicle processor categorizes the severity of this situation into levels. Each level corresponds to a predefined intensity of alert, ranging from mild to severe. For example, a low-level alert may involve a simple notification on the vehicle's display, while a high-level alert might activate multiple warning mechanisms, including audible alarms, flashing lights, and even vehicle lockdown procedures. The vehicle processor sends signals to the various alerting components within the vehicle's system. For example, it can send a command to the infotainment system to increase the volume of audible alerts or to modify the display brightness or color to make visual alerts more noticeable. If the vehicle is equipped with haptic feedback systems, such as vibrating seats or steering wheels, it may trigger these to a greater intensity to ensure the alert captures the occupant's attention. In scenarios where the adverse situation intensifies, the vehicle processor can escalate the alerts. For example, if the threat level increases, the processor can issue a command to the infotainment system to switch from displaying a warning message to sounding a siren sound through the vehicle's speakers.

In one embodiment, the instant solution incorporates communications enabling the vehicle to contact emergency services or predefined personal contacts, like a spouse, in an adverse situation. This system integrates the vehicle's array of sensors 152 and the vehicle processor 120. When the sensors, such as cameras, radar, LIDAR, and microphones, detect a situation evaluated as a threat, the processor initiates an alert. For emergency services, the system is equipped to dial 9-1-1 automatically. When contacting a spouse or another personal contact, the system uses the vehicle's cellular or data connection to send a message, which may be through short messaging service (SMS), email, or a connected application notification. The notification sent includes comprehensive details about the alert, such as text descriptions of the incident, video feed from the cameras showing the exterior and interior of the vehicle (if privacy settings allow for interior footage to be shared), and images that capture the event. Additionally, the vehicle's exact location is sent, utilizing an onboard GPS system, ensuring that the notification's recipient fully understands the situation's context.

In an alternate embodiment, the scenario is addressed where an occupant who has left the vehicle continues to receive real-time updates. In this case, the system remains in communication with the occupant's personal device, sending updates about content they were consuming before they exited, along with real-time notifications about any alerts. For example, if the occupant was watching a movie, the system may pause it and stream the alert details to their personal device instead. This ensures that the occupant is kept informed about the vehicle's status and any potential threats, even when they are not physically present. This communication protocol is designed to keep all relevant parties informed during an adverse event, leveraging the vehicle's connectivity to provide a seamless flow of critical information for the occupants and the vehicle's safety and security.

In one embodiment, the instant solution determines whether the audio content exceeds a certain decibel threshold and/or whether the audio is being delivered directly to the occupant's ears via a device. The vehicle processor 120 receives input from internal sensors capable of measuring sound levels within the vehicle cabin. These sensors gauge the decibel rating of the audio content being played. If this rating surpasses a predefined threshold, which is set considering the average human ability to hear external sounds over the content, the processor recognizes this as a potential issue for alert perception. The system detects whether the occupant is using a personal audio device. This can be determined through a direct connection status check. For example, if the personal device is connected to the vehicle's infotainment system via Bluetooth, indicating that audio is likely being transmitted to earphones. Upon making either of these determinations, the vehicle processor ceases the content. This action ensures that the occupant's attention can be directed to the alert. The cessation of content can be carried out by sending a command from the vehicle processor to the vehicle's infotainment system to stop playback or reduce the volume to an acceptable level. If the occupant is using a personal device, the command can be communicated wirelessly to the device, prompting it to pause or mute the content, thereby allowing the occupant to acknowledge the alert.

In one embodiment, when an adverse situation is detected by the vehicle processor 120, it commands a pause in the content being consumed. This may be content displayed on the vehicle display 134 or streamed to personal devices 132 such as smartphones or tablets.

For visual alerts, the system is configured to display the alert on the same screen that was being used for content consumption. This ensures that the alert is immediately visible to the occupant, leveraging their focus on that display. For example, if the occupant is watching a movie on the vehicle's central display, the alert may appear on this screen, overlaying or replacing the movie content. Audible alerts can be delivered through the vehicle's speaker system, which normally provides audio for the content. If the system identifies that the occupant is using personal ear-proximate devices, the audible alert can also be routed to those devices. This dual approach ensures that the occupant receives the alert regardless of their audio consumption method. In certain scenarios, multiple devices are in use simultaneously. It delivers different types of alerts to each device according to its capabilities and the nature of the content consumed. For example, if one occupant is watching a video on a tablet with headphones and another is browsing on a smartphone, a visual alert may pause the video and display it on the tablet, while an audible alert may come through the smartphone's speakers.

The system's ability to manage alerts across multiple devices is critical, especially when occupants are engaged with different forms of content across different devices.

To ascertain the focus of an occupant related to delivered content, the instant solution utilizes data from sensors that detect and analyze the occupant's physical orientation and movement. These sensors are integral to the vehicle's 102 internal monitoring system and are designed to capture detailed information about the occupant's state. The system may have sensors (such as cameras equipped with image recognition technology) placed within the vehicle's cabin to detect the direction of an occupant's gaze. These sensors focus on the occupant's face to identify the eyes' orientation and the head's position. Advanced functionality processes the visual data to ascertain where the occupant is looking, whether they are focused on a display screen within the vehicle or not. For monitoring engagement with audio content, such as music, the system utilizes sensors capable of detecting movement, possibly through motion sensors and cameras. These sensors observe the occupant and note rhythmic body movements that correlate with the beat or rhythm of the music, suggesting that the occupant is engaged with the audio content. The vehicle processor receives the data from these sensors and interprets it to determine the occupant's level of engagement. If the system needs to alert the occupant, such as an external threat or vehicle issue, it can tailor the alert delivery method based on the occupant's focus. For visually engaged occupant, the alert might be displayed prominently on the screen where they are looking. Conversely, if the occupant is listening to music and showing signs of rhythmic movement, the system might choose to issue an audible alert or a haptic signal, such as a vibration in the seat or steering wheel, to ensure it captures their attention.

In one embodiment, sensors 152 on vehicle 102 can notify vehicle processor 120 of damaged chargers. The sensors may detect the proximity of the vehicle when charging and indicate a situation that the instant solution determines to be an adverse situation. The adverse situation includes something happening within a proximity threshold of the charging point where the vehicle receives energy.

The terms energy, electricity, and charge refer to power derived from the utilization of physical or chemical resources.

A charging point may be a charging bay, charging station, or any location where electricity can be received by a vehicle. There may exist many charging points in a charging location. A charging point, charging bay, and/or charging station may be where a vehicle can receive and/or provide electricity. The use of the phrases: charging point, charging bay, or charging station may be a charging location.

In one embodiment, the instant solution monitors vehicles charging at a charging station, detects environmental hazards, and alerts the vehicle's occupants via the infotainment system when a hazard is detected. The system comprises a network of sensors capable of detecting various environmental hazards such as rising water levels, seismic activity, extreme weather conditions, or air quality degradation. When an EV is plugged into such a smart charging station, the system constantly monitors environmental data through its sensor array, including hygrometers, barometers, anemometers, seismographs, and air quality monitors. These sensors are strategically placed at the station and around the area it serves to provide comprehensive environmental coverage. Upon detecting an environmental risk that meets or exceeds a pre-set threshold, the system immediately initiates an alert protocol. The protocol sends a signal to the connected EV, triggering the vehicle's onboard alert system. Alerts are prioritized and categorized, with critical alerts overriding ongoing content delivery to ensure the safety message is received immediately. For instance, in flood detection, the system alerts the vehicle occupants with visual and audible warnings, suggests immediate evacuation routes, and potentially initiates vehicle systems to prepare for quick departure. For less immediate threats, such as a severe weather warning, the system allows content consumption to continue but displays periodic safety reminders or updates on the status of the impending hazard. The smart charging station is also connected to local and national environmental monitoring services, enabling it to receive updates and warnings from these services and then pass them on to the vehicle's occupants. Additionally, it is integrated with the grid to manage power distribution during emergencies, potentially prioritizing power to emergency services and critical infrastructure. The system also interacts with the vehicle's navigation system, providing route alterations to avoid hazardous areas or guiding occupants to the nearest safe location.

In one embodiment, the system delivers content and safety notifications through augmented reality (AR) display surfaces in a vehicle. The system utilizes the vehicle's windows and windshield to serve as transparent AR display surfaces, using advanced projection and display technologies that allow for the overlay of digital content onto the real-world view. When an EV is connected to the charging point, occupants can engage with various content—from entertainment to educational material—projected directly onto the glass surfaces. Occupants can interact with the content through gesture recognition, eye tracking, and touch-sensitive surfaces, providing a rich and interactive user experience. For instance, occupants can virtually explore a museum, watch a movie as if on a large screen, or have a video conference with a panoramic view of a distant cityscape, all while the vehicle is stationary and charging. The AR system is equipped with a multi-faceted alert mechanism. Using the vehicle's external sensors—such as cameras, LIDAR, and radar—the system continuously monitors the vehicle's surroundings for potential threats. When an adverse situation is detected, such as an unauthorized person approaching or a vehicle that seems out of control, the AR content delivery is immediately modified to incorporate safety notifications. These notifications are contextually overlaid on the AR display, ensuring they are visible without completely disrupting the AR experience. For example, if the AR system is displaying a virtual ocean scene on the windshield and a potential threat is detected on the vehicle's left side, a visual alert may ripple through the virtual water in the direction of the threat, subtly drawing the occupant's attention. This can be accompanied by an audible alert or a haptic feedback signal through the seats or steering wheel, ensuring the occupant is aware of the situation regardless of their engagement with the content. Moreover, the AR system adapts the content delivery based on the severity of the detected threat. In a high-risk scenario, the AR display switches to a safety mode, minimizing entertainment content and maximizing visibility for the driver to assess the situation, potentially even providing real-time instructions and escape routes.

In one embodiment, the instant solution leverages a vehicle-to-vehicle network to share information about adverse situations and potential threats. The system allows vehicles connected to nearby charging stations to form a localized network that shares information about potential threats or adverse situations detected by any individual vehicle in the network. For instance, if one vehicle's sensors detect suspicious activity in the vicinity, it can alert other connected vehicles, warning their occupants. The system utilizes vehicles equipped with V2V communication technology to autonomously exchange information with one another, creating a mesh network. When an EV is connected to a charging station, it becomes part of a local V2V network. The network comprises other nearby connected EVs, each serving as a node capable of sending and receiving safety-related data. The network's primary function is to maintain a shared awareness of potential threats or adverse situations detected by any of the vehicles within the network. For instance, if one vehicle's sensor suite-incorporating technologies like cameras, thermal imaging, and motion detectors-identifies suspicious behavior around a charging station, such as loitering or tampering with the charging equipment, it can instantly broadcast this information to all other EVs in the network. The received alerts can trigger a cascade of safety measures within each vehicle. The content delivery system within each vehicle pauses or adjusts the volume, and safety notifications are displayed on infotainment screens or projected onto HUDs (Heads-Up Displays). The notifications are context-sensitive, providing details about the nature and location of the threat and allowing occupants to remain informed and prepared to take appropriate action. For example, if the danger is localized to one area of a charging park, vehicles on the opposite side may receive a cautionary alert. In contrast, those near the threat may receive a more urgent warning. The V2V network adapts in real time to changes in the threat level. When a situation escalates, vehicles collectively enter a heightened state of alert, with the system recommending that occupants lock doors and remain inside or even initiating departure procedures if safe and feasible. In contrast, if a threat is neutralized—such as a suspicious individual being approached by security—the network can communicate the alert has been cancelled, resuming normal operations and content delivery. The V2V communication system extends beyond information sharing and can coordinate responses. For instance, vehicles in close proximity to a threat may automatically illuminate their exterior lights to deter a possible thief or illuminate a path to safety for pedestrians. In an emergency, the network serves to streamline evacuation, suggesting optimal routes away from the danger zone, thereby reducing the likelihood of congestion and chaos.

In one embodiment, the system leverages artificial intelligence (AI) algorithms to personalize the method and intensity of alerts to vehicle occupants based on their profiles. The system recognizes that each occupant may have different needs and preferences when receiving alerts, especially when engrossed in content consumption while their vehicle is charging. The system is equipped with advanced software that creates and manages detailed profiles for each occupant, which include their medical history, preferred alert types (visual, auditory, or haptic), previous responses to alerts, and even psychological profiles that might indicate the best way to alert them without causing panic. For example, an occupant with a hearing impairment might receive more robust visual or haptic alerts, while an easily startled occupant may benefit from a softer, more gradual auditory warning. When the vehicle is connected to a charging point, it enters a state of heightened readiness, wherein the vehicle's sensors-both internal and external-monitor for any signs of adverse situations, such as an attempted break-in or a nearby accident. Upon detecting such an event, the vehicle's system consults the occupant profiles to determine the most effective way to issue an alert. The system's AI analyzes the context, considering factors such as the time of day (alerts at night might be different from those during the day), the nature of the content being consumed (audio, visual, interactive), and the specific safety needs of the occupant. The system integrates biometric sensors that monitor the occupant's physical state, such as heart rate or stress levels, to adjust the alert in real-time. When the system detects elevated stress, it delivers a calming message alongside the alert to reassure the occupant. For an occupant engrossed in a virtual reality (VR) experience, the system can pause the experience and replace it with a VR simulation that guides them to safety. The system remembers the occupant's responses to past alerts to refine future notifications. If an occupant frequently fails to respond to audible alerts, the system may prioritize visual messages or haptic feedback for them. In families with children, the system might automatically disable specific alerts that may frighten young passengers, instead sending notifications directly to the adult occupants' devices or the driver's display.

In one embodiment, the system integrates a vehicle's alert system with an emergency response protocol. When an EV is plugged into a charging station, it remains in a state of constant readiness to deal with potential emergencies. The system has many sensors that can detect various threats or emergencies, such as fire, accidents within or around the vehicle, medical emergencies involving the occupants, or security breaches, such as attempted theft or vandalism. In the event of an emergency detection, the system immediately assesses the severity of the situation. The system autonomously contacts emergency services for critical emergencies requiring immediate human intervention. This is done through an integrated communication system that can dial emergency numbers, send out location-based messages for help, and provide first responders with real-time data about the nature of the emergency. For instance, if an occupant suffers a medical emergency, the vehicle can contact emergency medical services and provide them with the occupant's known medical history and current vital signs, if available. Simultaneously, the system communicates with the occupants through visual and auditory alerts, offering guidance on how to proceed. This includes instructions for evacuating the vehicle, advice on administering first aid, and information on waiting until help arrives. The infotainment system's displays and speakers ensure clear messages and instructions are easy to follow. For non-critical emergencies that still require attention, such as minor security issues or technical faults with the charging station, the vehicle sends notifications to the occupants' devices, the vehicle manufacturer's monitoring service, or the infrastructure operator's maintenance team. The vehicle's interface also gives the occupants direct access to emergency features, such as a panic button or a medical assistance request, which can trigger the emergency protocol manually. Additionally, if the vehicle is part of a connected network, it can inform other nearby vehicles of the emergency, potentially receiving assistance or clearing the way for emergency responders.

In one embodiment, the system alerts electric vehicle occupants currently consuming content to adverse situations in their vicinity while the vehicle is connected to a charging point. The system integrates a sophisticated array of sensors, including external sensors like cameras, radar, LIDAR, and microphones, strategically placed around the vehicle to monitor its surroundings for potential threats or unusual activities. The sensors can detect the presence of objects or individuals near the vehicle and any attempts to tamper with the vehicle or the charging apparatus. The data collected by these sensors is sent to the system, equipped with software capable of analyzing the data to assess the probability of a threat. Internally, the vehicle features sensors that monitor the presence and engagement of occupants with the content being delivered. This includes cameras equipped with image recognition technology to determine the direction of an occupant's gaze and motion sensors to detect engagement with audio content through rhythmic body movements. This allows the system to understand the level of engagement of occupants with the content being consumed, enabling it to tailor the delivery method of alerts accordingly. When the system determines that an adverse situation is occurring or imminent based on the data received from the external sensors, it initiates an alert protocol. The protocol involves the issuance of visual, audible, and haptic alerts through the vehicle's integrated alerting mechanisms, such as the vehicle display, audio outputs, and haptic feedback devices like vibrating seats or steering wheels. The nature of the alert and the delivery method are dynamically adjusted based on the severity of the detected threat and the occupant's current engagement with the content. The system also features a dynamic content transfer functionality, ensuring a seamless content delivery transition between the vehicle's display systems and the occupant's personal devices. This is particularly relevant when an occupant decides to exit or re-enter the vehicle, allowing for uninterrupted media consumption. Furthermore, the system can control how content is distributed within the vehicle, whether streamed to the vehicle display or the occupant's devices, adjusting the delivery of alerts accordingly. In detecting an adverse situation, such as a potential break-in or damage to the vehicle, the system can also communicate with emergency services or predefined personal contacts, providing comprehensive details about the situation, including video feeds, images, and the vehicle's precise location.

Flow diagrams depicted herein, such as FIG. 1B, FIG. 2C, FIG. 2D, FIG. 2E, and FIG. 2F, are separate examples but may be the same or different embodiments. Any of the operations in one flow diagram may be adopted and shared with another flow diagram. No example operation is intended to limit the subject matter of any embodiment or corresponding claim.

It is important to note that all the flow diagrams and corresponding processes derived from FIG. 1B, FIG. 2C, FIG. 2D, FIG. 2E, and FIG. 2F may be part of a same process or may share sub-processes with one another thus making the diagrams combinable into a single preferred embodiment that does not require any one specific operation but which performs certain operations from one example process and from one or more additional processes. All the example processes are related to the same physical system and can be used separately or interchangeably.

The instant solution can be used in conjunction with one or more types of vehicles: battery electric vehicles, hybrid vehicles, fuel cell vehicles, internal combustion engine vehicles and/or vehicles utilizing renewable sources.

Figure 2A:
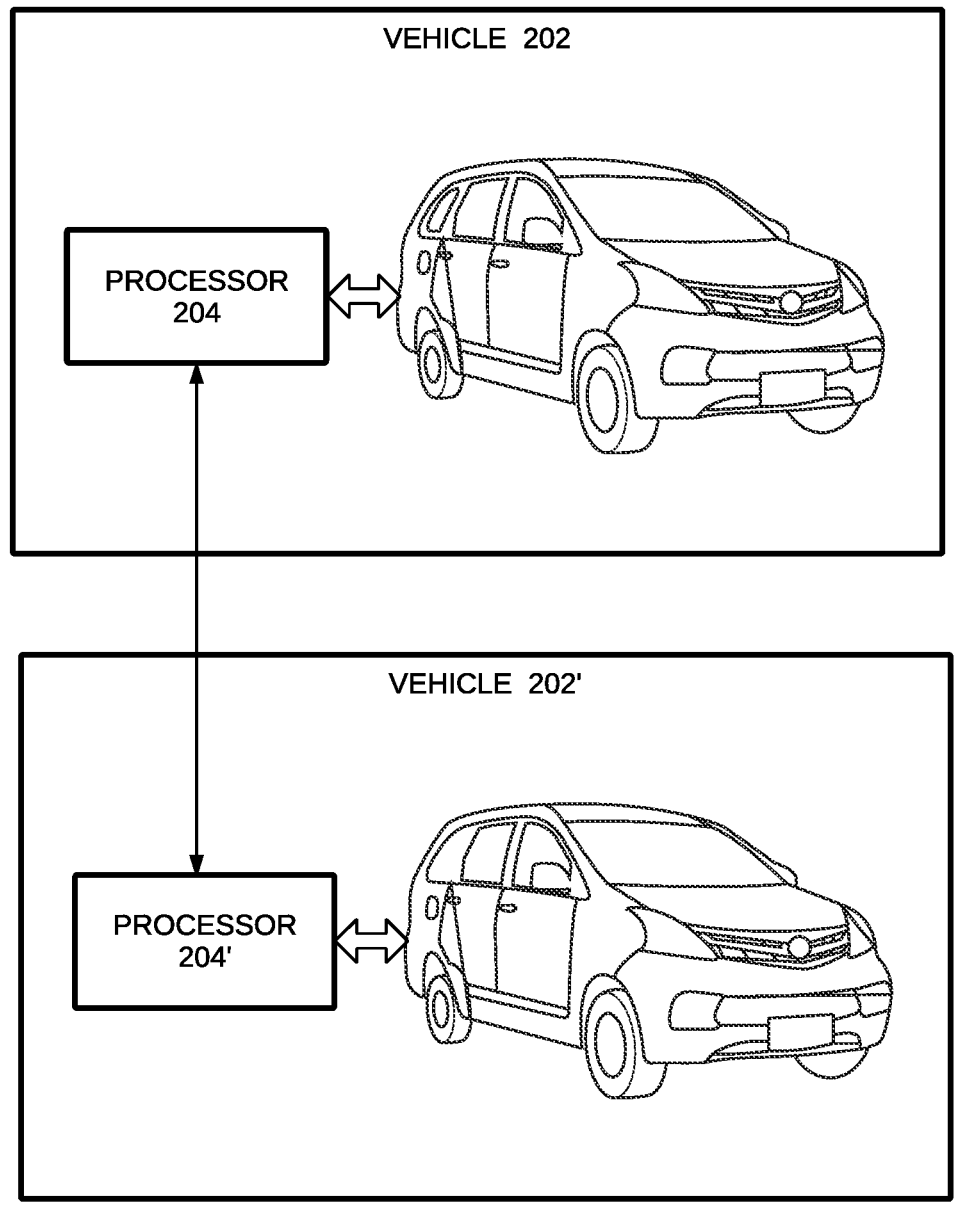
FIG. 2A illustrates a vehicle network diagram, according to example embodiments.

FIG. 2A illustrates a vehicle network diagram 200, according to example embodiments. The network comprises elements including a vehicle 202 including a processor 204, as well as a vehicle 202' including a processor 204'. The vehicles 202, 202' communicate with one another via the processors 204, 204', as well as other elements (not shown) including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and software. Although depicted as single vehicles and processors, a plurality of vehicles and processors may be present. One or more of the applications, features, steps, solutions, etc., described and/or depicted herein may be utilized and/or provided by the instant elements.

Figure 2B:
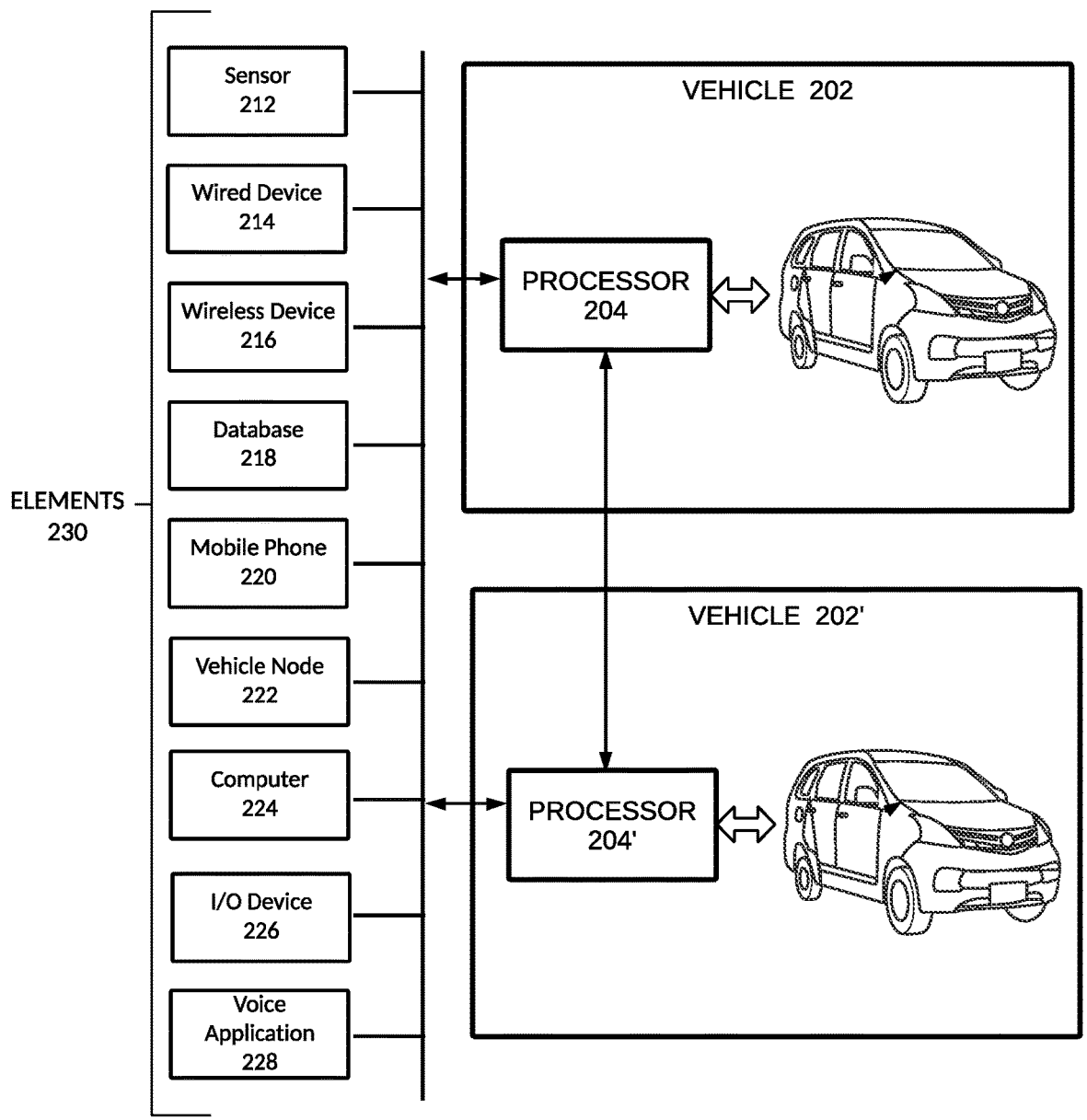
FIG. 2B illustrates another vehicle network diagram, according to example embodiments.

FIG. 2B illustrates another vehicle network diagram 210, according to example embodiments. The network comprises elements including a vehicle 202 including a processor 204, as well as a vehicle 202' including a processor 204'. The vehicles 202, 202' communicate with one another via the processors 204, 204', as well as other elements (not shown), including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and software. The processors 204, 204' can further communicate with one or more elements 230 including sensor 212, wired device 214, wireless device 216, database 218, mobile phone 220, vehicle 222, computer 224, input/output (I/O) device 226, and voice application 228. The processors 204, 204' can further communicate with elements comprising one or more of a processor, memory, and software.

Although depicted as single vehicles, processors and elements, a plurality of vehicles, processors and elements may be present. Information or communication can occur to and/or from any of the processors 204, 204' and elements 230. For example, the mobile phone 220 may provide information to the processor 204, which may initiate the vehicle 202 to take an action, may further provide the information or additional information to the processor 204', which may initiate the vehicle 202' to take an action, may further provide the information or additional information to the mobile phone 220, the vehicle 222, and/or the computer 224. One or more of the applications, features, steps, solutions, etc., described and/or depicted herein may be utilized and/or provided by the instant elements.

Figure 2C:
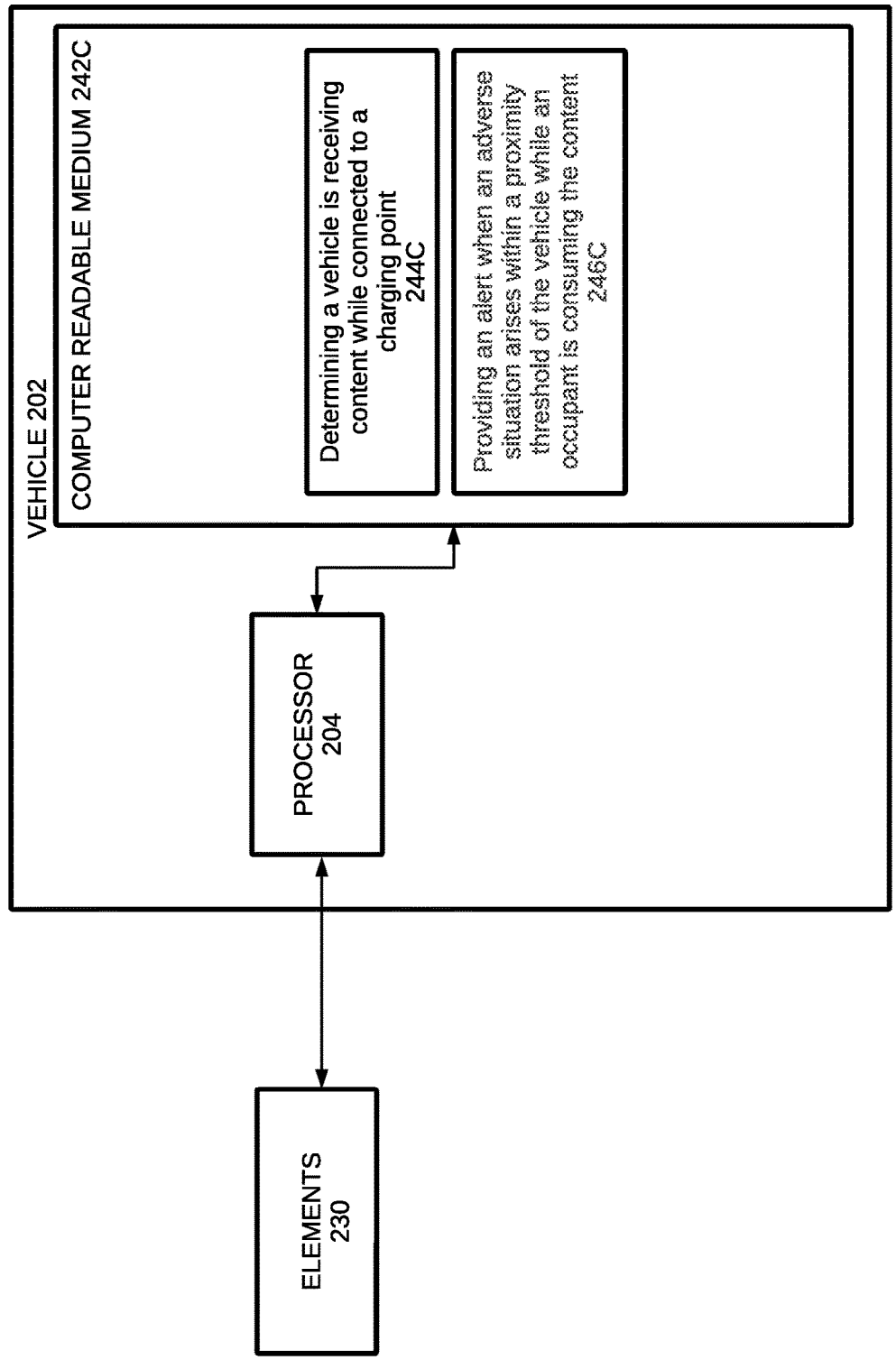
FIG. 2C illustrates yet another vehicle network diagram, according to example embodiments.

FIG. 2C illustrates yet another vehicle network diagram 240, according to example embodiments. The network comprises elements including a vehicle 202, a processor 204, and a non-transitory computer-readable medium 242C. The processor 204 is communicably coupled to the non-transitory computer-readable medium 242C and elements 230 (which were depicted in FIG. 2B). The vehicle 202 may be a vehicle, server, or any device with a processor and memory.

The processor 204 performs one or more of determining a vehicle is receiving content while connected to a charging point 244C, providing an alert when an adverse situation arises within a proximity threshold of the vehicle while an occupant is consuming the content 246C.

Figure 2D:
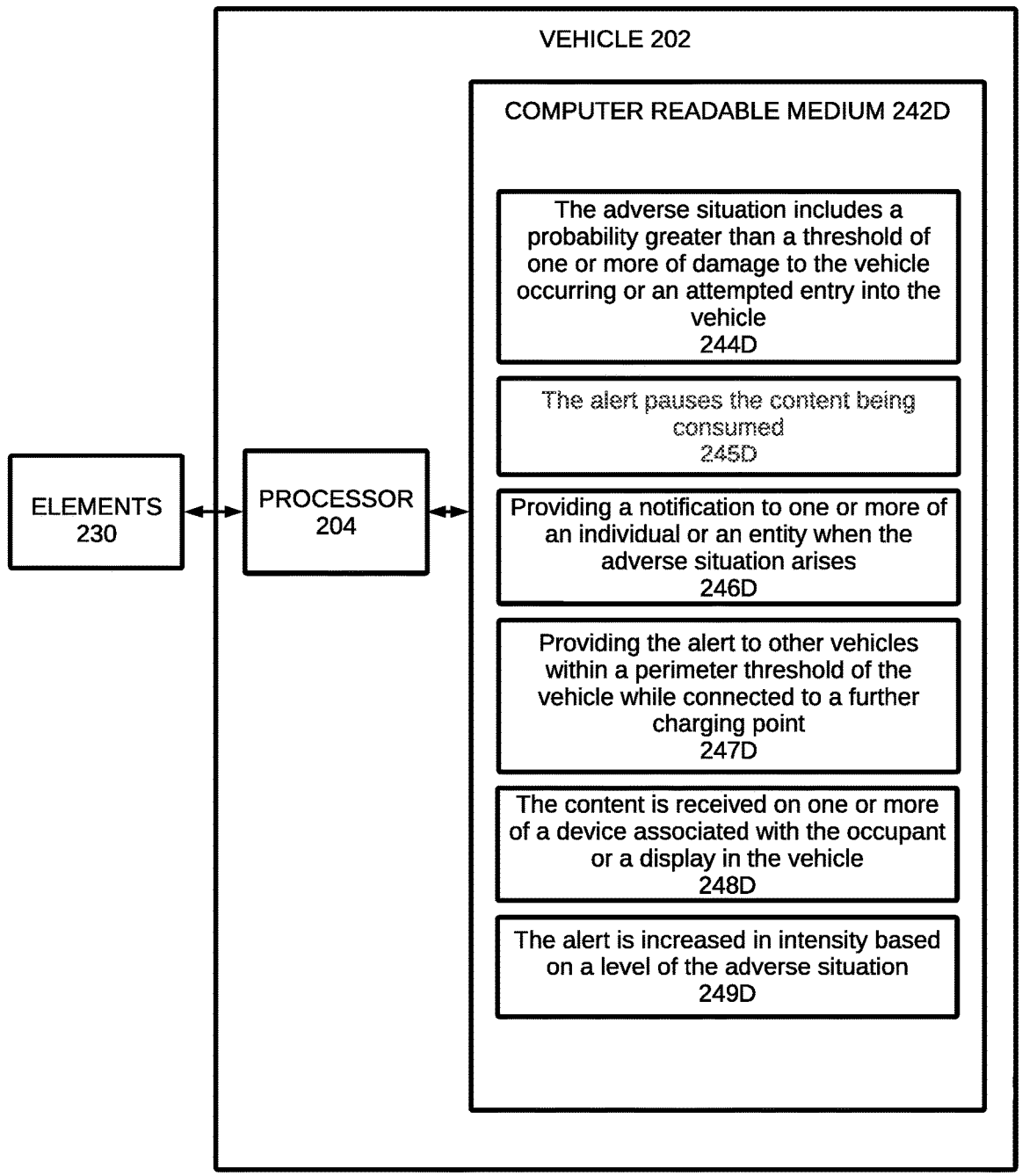
FIG. 2D illustrates a further vehicle network diagram, according to example embodiments.

FIG. 2D illustrates a further vehicle network diagram 250, according to example embodiments. The network comprises elements including a vehicle 202 a processor 204, and a non-transitory computer-readable medium 242D. The processor 204 is communicably coupled to the non-transitory computer-readable medium 242D and elements 230 (which were depicted in FIG. 2B). The vehicle 202 may be a vehicle, server or any device with a processor and memory.

The processor 204 performs one or more of the adverse situation includes a probability greater than a threshold of one or more of damage to the vehicle occurring or an attempted entry into the vehicle 244D, the alert pauses the content being consumed 245D, providing a notification to one or more of an individual or an entity when the adverse situation arises 246D, providing the alert to other vehicles within a perimeter threshold of the vehicle while connected to a further charging point 247D, the content is received on one or more of a device associated with the occupant or a display in the vehicle 248D, the alert is increased in intensity based on a level of the adverse situation 249D.

While this example describes in detail only one vehicle 202, multiple such nodes may be connected to the blockchain. It should be understood that the vehicle 202 may include additional components and that some of the components described herein may be removed and/or modified without departing from a scope of the instant application. The vehicle 202 may have a computing device or a server computer, or the like, and may include a processor 204, which may be a semiconductor-based microprocessor, a central processing unit (CPU), an application-specific integrated circuit (ASIC), a field-programmable gate array (FPGA), and/or another hardware device. Although a single processor 204 is depicted, it should be understood that the vehicle 202 may include multiple processors, multiple cores, or the like without departing from the scope of the instant application. The vehicle 202 may be a vehicle, server or any device with a processor and memory.

The processor 204 performs one or more of receiving a confirmation of an event from one or more elements described or depicted herein, wherein the confirmation comprises a blockchain consensus between peers represented by any of the elements and executing a smart contract to record the confirmation on the blockchain consensus. Consensus is formed between one or more of any element 230 and/or any element described or depicted herein, including a vehicle, a server, a wireless device, etc. In another example, the vehicle 202 can be one or more of any element 230 and/or any element described or depicted herein, including a server, a wireless device, etc.

The processors and/or computer-readable medium may fully or partially reside in the interior or exterior of the vehicles. The steps or features stored in the computer-readable medium may be fully or partially performed by any of the processors and/or elements in any order. Additionally, one or more steps or features may be added, omitted, combined, performed at a later time, etc.

Figure 2E:
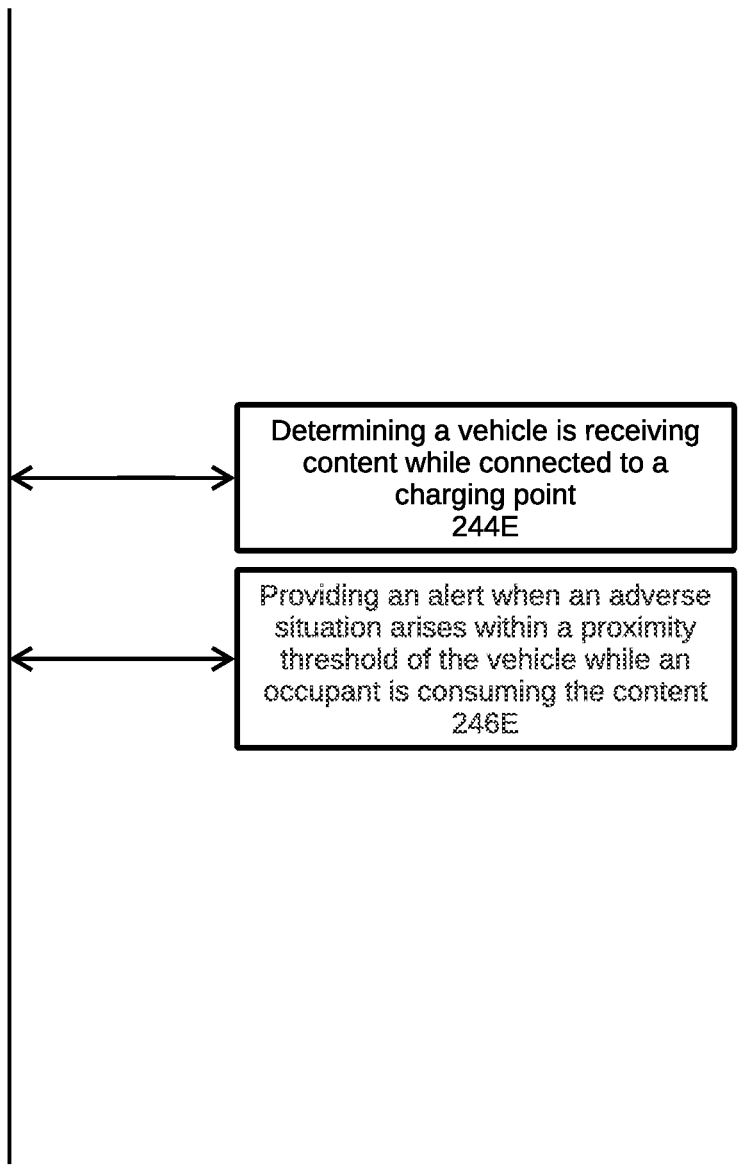
FIG. 2E illustrates a flow diagram, according to example embodiments.

FIG. 2E illustrates a flow diagram 260, according to example embodiments. Referring to FIG. 2E, the instant solution includes one or more of determining a vehicle is receiving content while connected to a charging point 244E, providing an alert when an adverse situation arises within a proximity threshold of the vehicle while an occupant is consuming the content 246E.

Figure 2F:
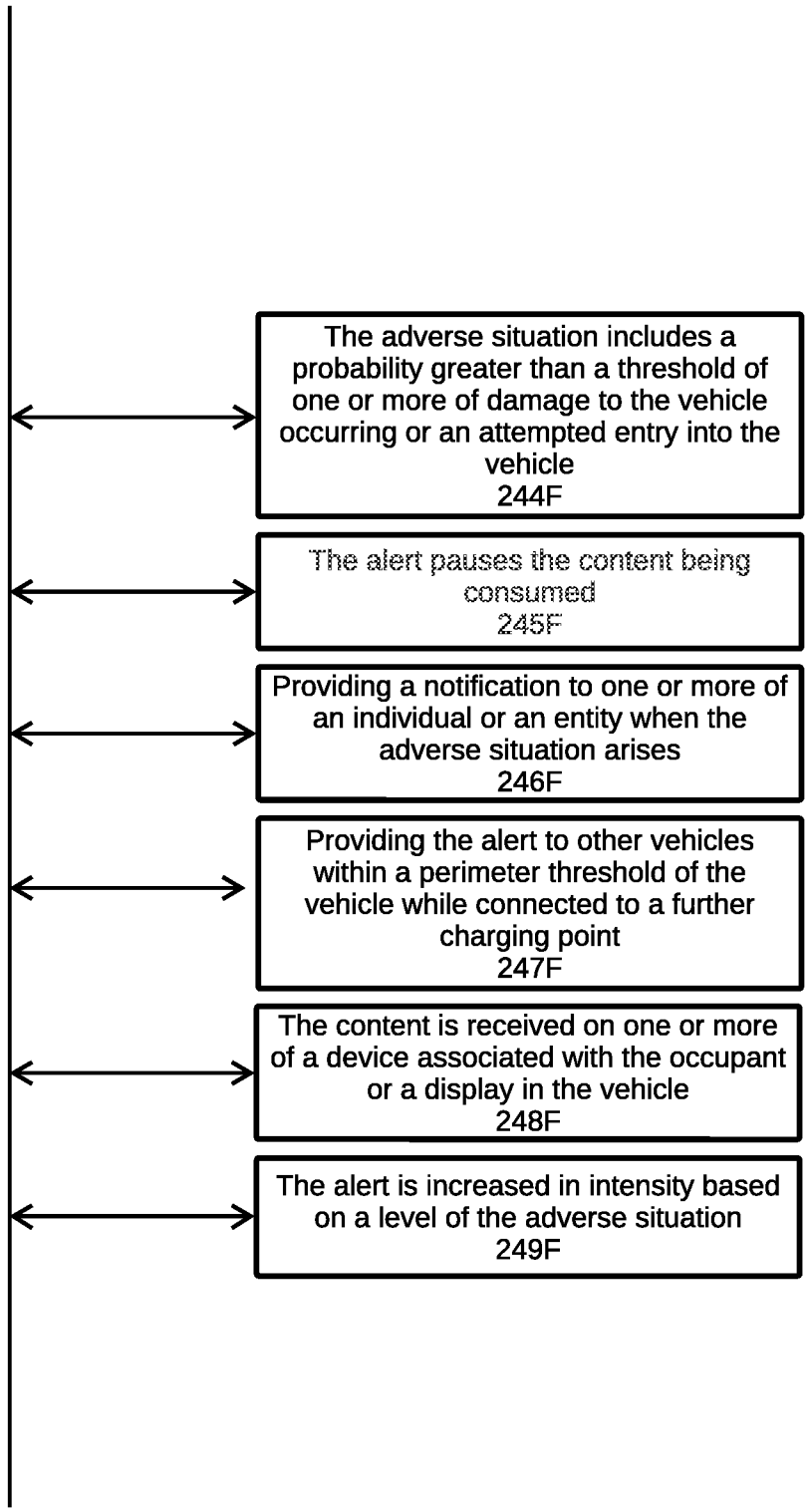
FIG. 2F illustrates another flow diagram, according to example embodiments.

FIG. 2F illustrates another flow diagram 270, according to example embodiments. Referring to FIG. 2F, the instant solution includes one or more of the adverse situation includes a probability greater than a threshold of one or more of damage to the vehicle occurring or an attempted entry into the vehicle 244F, the alert pauses the content being consumed 245F, providing a notification to one or more of an individual or an entity when the adverse situation arises 246F, providing the alert to other vehicles within a perimeter threshold of the vehicle while connected to a further charging point 247F, the content is received on one or more of a device associated with the occupant or a display in the vehicle 248F, the alert is increased in intensity based on a level of the adverse situation 249F.

Technological advancements typically build upon the fundamentals of predecessor technologies; such is the case with Artificial Intelligence (AI) models. An AI classification system describes the stages of AI progression. The first classification is known as "Reactive Machines," followed by present-day AI classification "Limited Memory Machines" (also known as "Artificial Narrow Intelligence"), then progressing to "Theory of Mind" (also known as "Artificial General Intelligence"), and reaching the AI classification "Self-Aware" (also known as "Artificial Superintelligence"). Present-day Limited Memory Machines are a growing group of AI models built upon the foundation of its predecessor, Reactive Machines. Reactive Machines emulate human responses to stimuli; however, they are limited in their capabilities as they cannot typically learn from prior experience. Once the AI model's learning abilities emerged, its classification was promoted to Limited Memory Machines. In this present-day classification, AI models learn from large volumes of data, detect patterns, solve problems, generate and predict data, and the like, while inheriting all of the capabilities of Reactive Machines. Examples of AI models classified as Limited Memory Machines include, but are not limited to, Chatbots, Virtual Assistants, Machine Learning (ML), Deep Learning (DL), Natural Language Processing (NLP), Generative AI (GenAI) models, and any future AI models that are yet to be developed possessing characteristics of Limited Memory Machines. Generative AI models combine Limited Memory Machine technologies, incorporating ML and DL, forming the foundational building blocks of future AI models. For example, Theory of Mind is the next progression of AI that may be able to perceive, connect, and react by generating appropriate reactions in response to an entity with which the AI model is interacting; all of these capabilities rely on the fundamentals of Generative AI. Furthermore, in an evolution into the Self-Aware classification, AI models will be able to understand and evoke emotions in the entities they interact with, as well as possessing their own emotions, beliefs, and needs, all of which rely on Generative AI fundamentals of learning from experiences to generate and draw conclusions about itself and its surroundings. Generative AI models are integral and core to future artificial intelligence models. As described herein, Generative AI refers to present-day Generative AI models and future AI models.

Figure 3A:
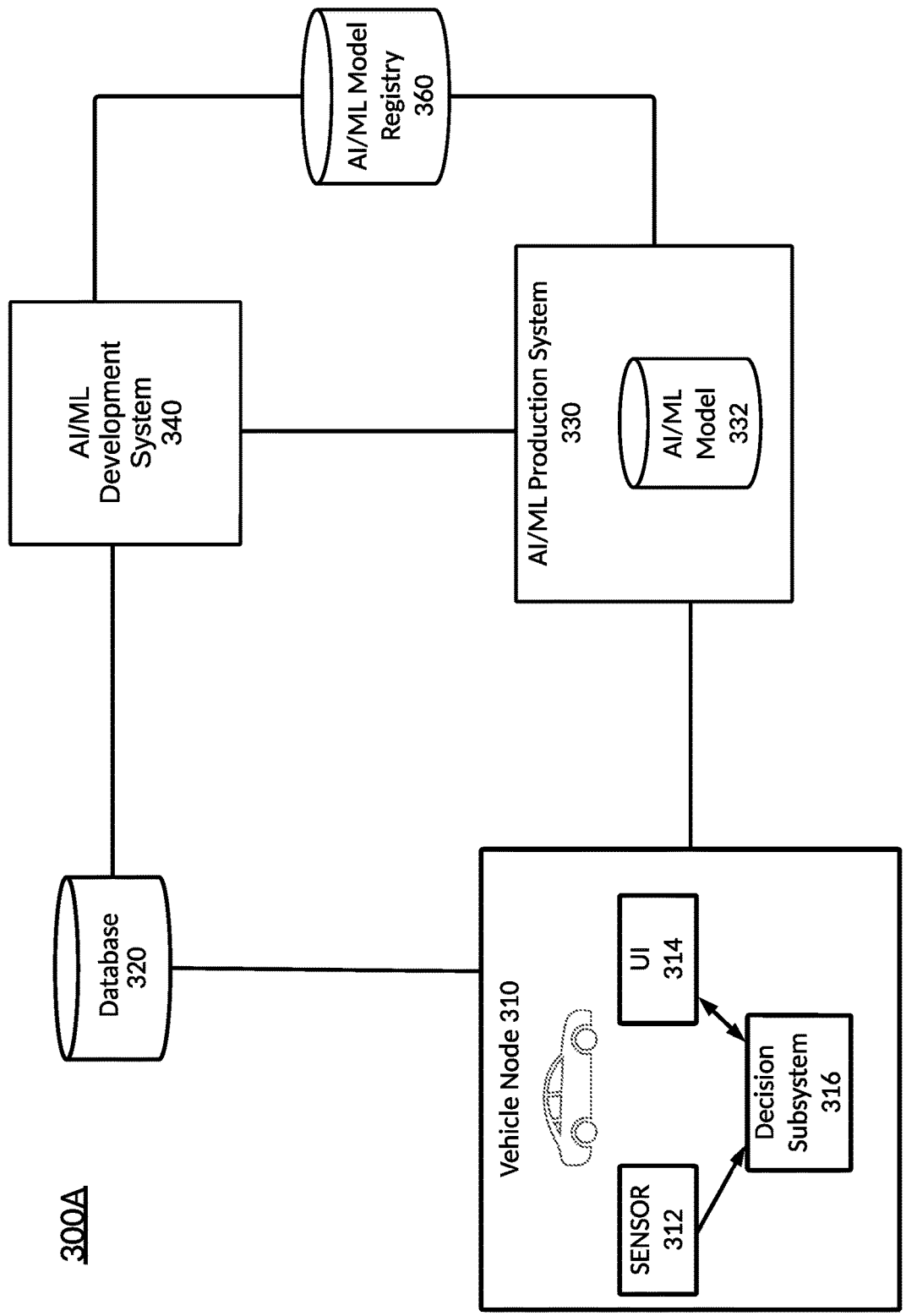
FIG. 3A illustrates an Artificial Intelligence (AI)/Machine Learning (ML) network diagram for integrating an artificial intelligence (AI) model into any decision point in the example embodiments.

FIG. 3A illustrates an AI/ML network diagram 300A that supports AI-assisted vehicle or occupant decision points. Other branches of AI, such as, but not limited to, computer vision, fuzzy logic, expert systems, neural networks/deep learning, generative AI, and natural language processing, may all be employed in developing the AI model shown in these embodiments. Further, the AI model included in these embodiments is not limited to particular AI algorithms. Any algorithm or combination of algorithms related to supervised, unsupervised, and reinforcement learning algorithms may be employed.

In one embodiment, Generative AI (GenAI) may be used by the instant solution in the transformation of data. Vehicles are equipped with diverse sensors, cameras, radars, and LIDARs, which collect a vast array of data, such as images, speed readings, GPS data, and acceleration metrics. However, raw data, once acquired, undergoes preprocessing that may involve normalization, anonymization, missing value imputation, or noise reduction to allow the data to be further used effectively.

The GenAI executes data augmentation following the preprocessing of the data. Due to the limitation of datasets in capturing the vast complexity of real-world vehicle scenarios, augmentation tools are employed to expand the dataset. This might involve image-specific transformations like rotations, translations, or brightness adjustments. For non-image data, techniques like jittering can be used to introduce synthetic noise, simulating a broader set of conditions.

In the instant solution, data generation is then performed on the data. Tools like Generative Adversarial Networks (GANs) and Variational Autoencoders (VAEs) are trained on existing datasets to generate new, plausible data samples. For example, GANs might be tasked with crafting images showcasing vehicles in uncharted conditions or from unique perspectives. As another example, the synthesis of sensor data may be performed to model and create synthetic readings for such scenarios, enabling thorough system testing without actual physical encounters. A critical step in the use of GenAI, given the safety-critical nature of vehicles, is validation. This validation might include the output data being compared with real-world datasets or using specialized tools like a GAN discriminator to gauge the realism of the crafted samples.

Vehicle node 310 may include a plurality of sensors 312 that may include but are not limited to, light sensors, weight sensors, cameras, lidar, and radar. In some embodiments, these sensors 312 send data to a database 320 that stores data about the vehicle and occupants of the vehicle. In some embodiments, these sensors 312 send data to one or more decision subsystems 316 in vehicle node 310 to assist in decision-making.

Vehicle node 310 may include one or more user interfaces (UIs) 314, such as a steering wheel, navigation controls, audio/video controls, temperature controls, etc. In some embodiments, these UIs 314 send data to a database 320 that stores event data about the UIs 314 that includes but is not limited to selection, state, and display data. In some embodiments, these UIs 314 send data to one or more decision subsystems 316 in vehicle node 310 to assist decision-making.

Vehicle node 310 may include one or more decision subsystems 316 that drive a decision-making process around, but are not limited to, vehicle control, temperature control, charging control, etc. In some embodiments, the decision subsystems 316 gather data from one or more sensors 312 to aid in the decision-making process. In some embodiments, a decision subsystem 316 may gather data from one or more UIs 314 to aid in the decision-making process. In some embodiments, a decision subsystem 316 may provide feedback to a UI 314.

An AI/ML production system 330 may be used by a decision subsystem 316 in a vehicle node 310 to assist in its decision-making process. The AI/ML production system 330 includes one or more AI/ML models 332 that are executed to retrieve the needed data, such as, but not limited to, a prediction, a categorization, a UI prompt, etc. In some embodiments, an AI/ML production system 330 is hosted on a server. In some embodiments, the AI/ML production system 330 is cloud-hosted. In some embodiments, the AI/ML production system 330 is deployed in a distributed multi-node architecture. In some embodiments, the AI production system resides in vehicle node 310.

An AI/ML development system 340 creates one or more AI/ML models 332. In some embodiments, the AI/ML development system 340 utilizes data in the database 320 to develop and train one or more AI models 332. In some embodiments, the AI/ML development system 340 utilizes feedback data from one or more AI/ML production systems 330 for new model development and/or existing model re-training. In an embodiment, the AI/ML development system 340 resides and executes on a server. In another embodiment the AI/ML development system 340 is cloud hosted. In a further embodiment, the AI/ML development system 340 utilizes a distributed data pipeline/analytics engine.

Once an AI/ML model 332 has been trained and validated in the AI/ML development system 340, it may be stored in an AI/ML model registry 360 for retrieval by either the AI/ML development system 340 or by one or more AI/ML production systems 330. The AI/ML model registry 360 resides in a dedicated server in one embodiment. In some embodiments, the AI/ML model registry 360 is cloud-hosted. The AI/ML model registry 360 is a distributed database in other embodiments. In further embodiments, the AI/ML model registry 360 resides in the AI/ML production system 330.

Figure 3B:
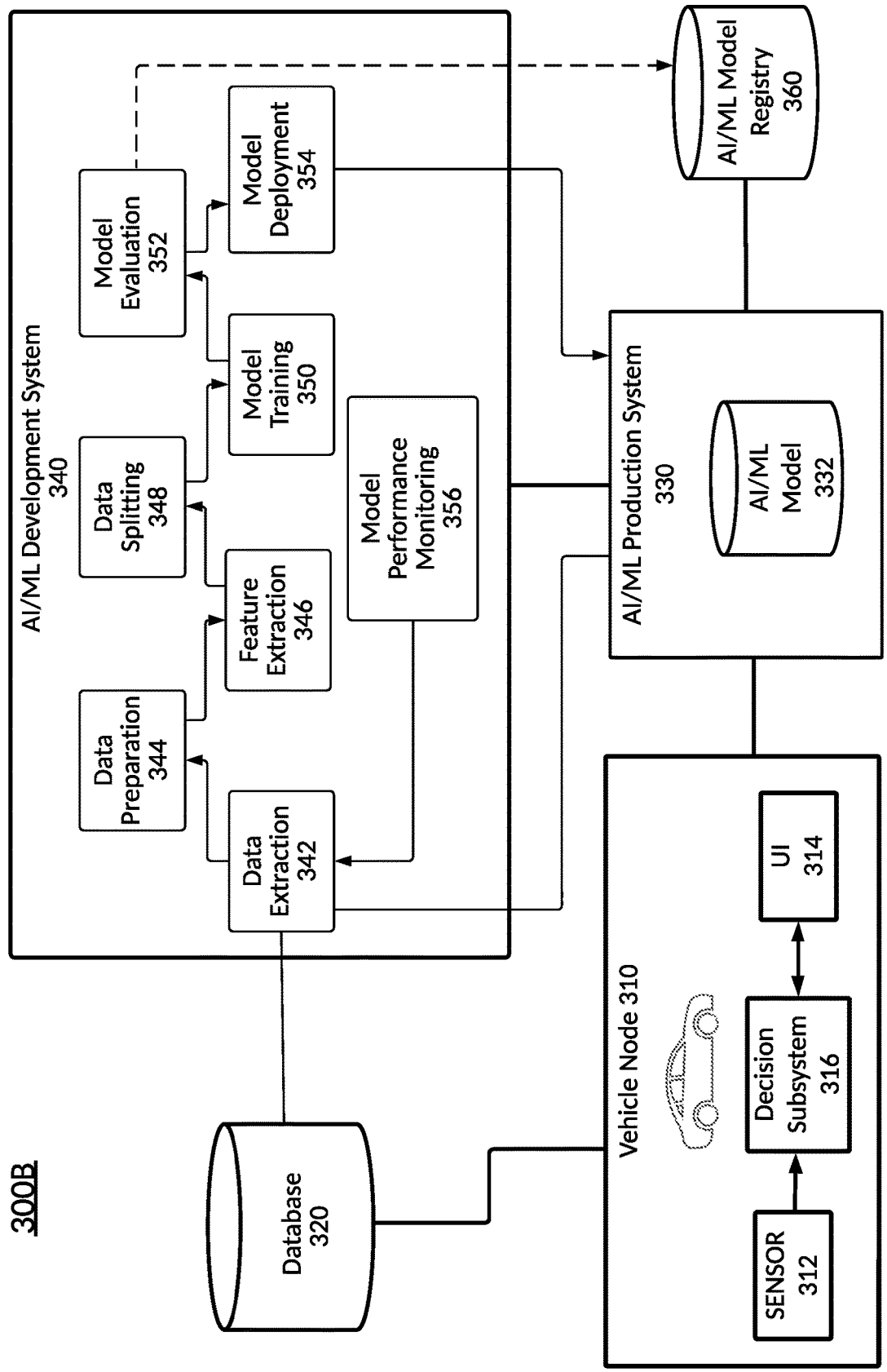
FIG. 3B illustrates a process for developing an Artificial Intelligence (AI)/Machine Learning (ML) model that supports AI-assisted vehicle or occupant decision points.

FIG. 3B illustrates a process 300B for developing one or more AI/ML models that support AI-assisted vehicle or occupant decision points. An AI/ML development system 340 executes steps to develop an AI/ML model 332 that begins with data extraction 342, in which data is loaded and ingested from one or more data sources. In some embodiments, vehicle and user data is extracted from a database 320. In some embodiments, model feedback data is extracted from one or more AI/ML production systems 330.

Once the required data has been extracted 342, it must be prepared 344 for model training. In some embodiments, this step involves statistical testing of the data to see how well it reflects real-world events, its distribution, the variety of data in the dataset, etc. In some embodiments, the results of this statistical testing may lead to one or more data transformations being employed to normalize one or more values in the dataset. In some embodiments, this step includes cleaning data deemed to be noisy. A noisy dataset includes values that do not contribute to the training, such as but are not limited to, null and long string values. Data preparation 344 may be a manual process or an automated process using one or more of the elements, functions described or depicted herein.

Features of the data are identified and extracted 346. In some embodiments, a feature of the data is internal to the prepared data from step 344. In other embodiments, a feature of the data requires a piece of prepared data from step 344 to be enriched by data from another data source to be useful in developing an AI/ML model 332. In some embodiments, identifying features is a manual process or an automated process using one or more of the elements, functions described or depicted herein. Once the features have been identified, the values of the features are collected into a dataset that will be used to develop the AI/ML model 332.

The dataset output from feature extraction step 346 is split 348 into a training and validation data set. The training data set is used to train the AI/ML model 332, and the validation data set is used to evaluate the performance of the AI/ML model 332 on unseen data.

The AI/ML model 332 is trained and tuned 350 using the training data set from the data splitting step 348. In this step, the training data set is fed into an AI/ML algorithm and an initial set of algorithm parameters. The performance of the AI/ML model 332 is then tested within the AI/ML development system 340 utilizing the validation data set from step 348. These steps may be repeated with adjustments to one or more algorithm parameters until the model's performance is acceptable based on various goals and/or results.

The AI/ML model 332 is evaluated 352 in a staging environment (not shown) that resembles the ultimate AI/ML production system 330. This evaluation uses a validation dataset to ensure the performance in an AI/ML production system 330 matches or exceeds expectations. In some embodiments, the validation dataset from step 348 is used. In other embodiments, one or more unseen validation datasets are used. In some embodiments, the staging environment is part of the AI/ML development system 340. In other embodiments, the staging environment is managed separately from the AI/ML development system 340. Once the AI/ML model 332 has been validated, it is stored in an AI/ML model registry 360, which can be retrieved for deployment and future updates. As before, in some embodiments, the model evaluation step 352 is a manual process or an automated process using one or more of the elements, functions described or depicted herein.

Once an AI/ML model 332 has been validated and published to an AI/ML model registry 360, it may be deployed 354 to one or more AI/ML production systems 330. In some embodiments, the performance of deployed AI/ML models 332 is monitored 356 by the AI/ML development system 340. In some embodiments, AI/ML model 332 feedback data is provided by the AI/ML production system 330 to enable model performance monitoring 356. In some embodiments, the AI/ML development system 340 periodically requests feedback data for model performance monitoring 356. In some embodiments, model performance monitoring includes one or more triggers that result in the AI/ML model 332 being updated by repeating steps 342-354 with updated data from one or more data sources.

Figure 3C:
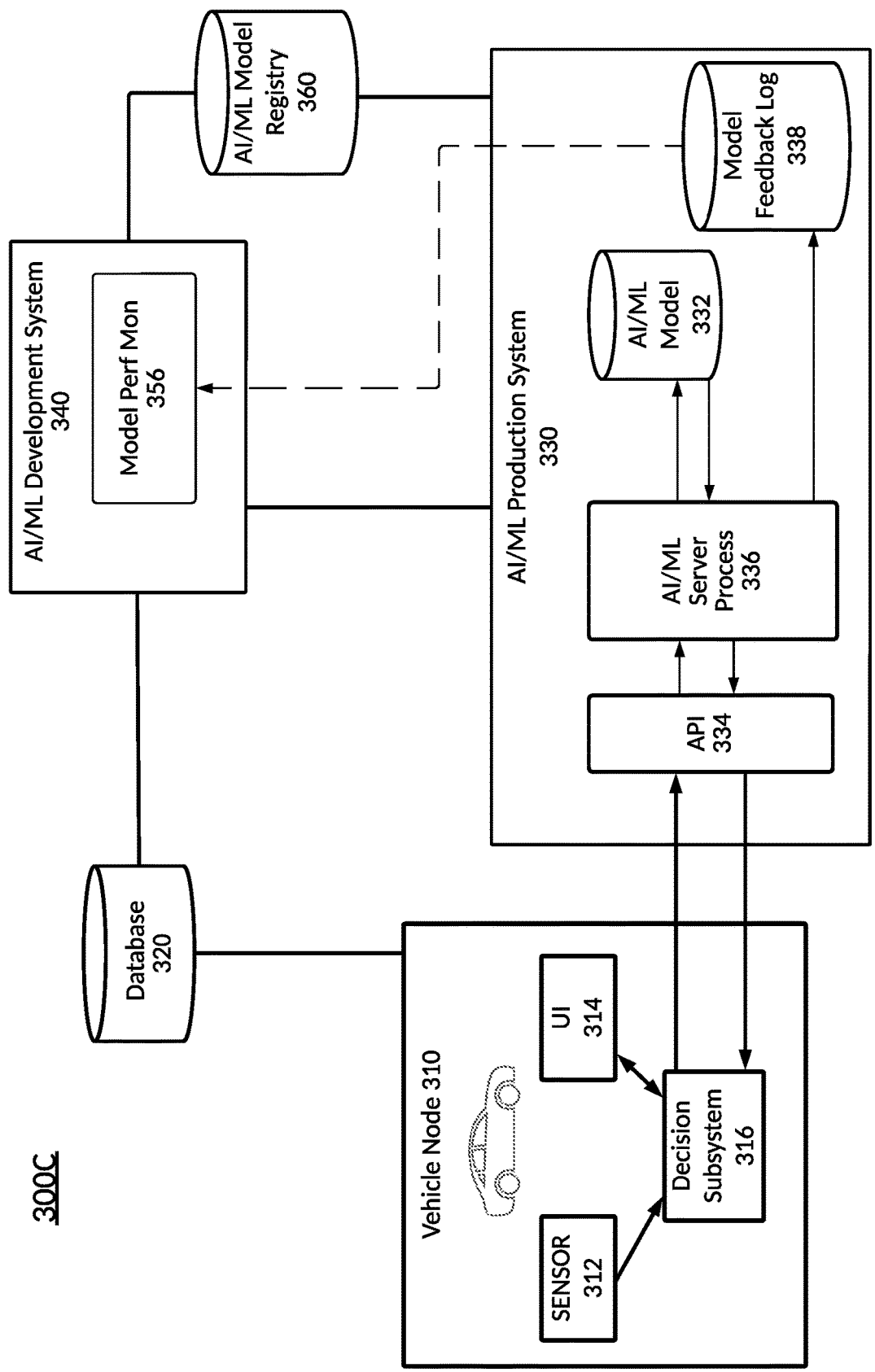
FIG. 3C illustrates a process for utilizing an Artificial Intelligence (AI)/Machine Learning (ML) model that supports AI-assisted vehicle or occupant decision points.

FIG. 3C illustrates a process 300C for utilizing an AI/ML model that supports AI-assisted vehicle or occupant decision points. As stated previously, the AI model utilization process depicted herein reflects ML, which is a particular branch of AI, but the instant solution is not limited to ML and is not limited to any AI algorithm or combination of algorithms.

Referring to FIG. 3C, an AI/ML production system 330 may be used by a decision subsystem 316 in vehicle node 310 to assist in its decision-making process. The AI/ML production system 330 provides an application programming interface (API) 334, executed by an AI/ML server process 336 through which requests can be made. In some embodiments, a request may include an AI/ML model 332 identifier to be executed. In some embodiments, the AI/ML model 332 to be executed is implicit based on the type of request. In some embodiments, a data payload (e.g., to be input to the model during execution) is included in the request. In some embodiments, the data payload includes sensor 312 data from vehicle node 310. In some embodiments, the data payload includes UI 314 data from vehicle node 310. In some embodiments, the data payload includes data from other vehicle node 310 subsystems (not shown), including but not limited to, occupant data subsystems. In an embodiment, one or more elements or nodes 320, 330, 340, or 360 may be located in the vehicle node 310.

Upon receiving the API 334 request, the AI/ML server process 336 may need to transform the data payload or portions of the data payload to be valid feature values into an AI/ML model 332. Data transformation may include but is not limited to combining data values, normalizing data values, and enriching the incoming data with data from other data sources. Once any required data transformation occurs, the AI/ML server process 336 executes the appropriate AI/ML model 332 using the transformed input data. Upon receiving the execution result, the AI/ML server process 336 responds to the API caller, which is a decision subsystem 316 of vehicle node 310. In some embodiments, the response may result in an update to a UI 314 in vehicle node 310. In some embodiments, the response includes a request identifier that can be used later by the decision subsystem 316 to provide feedback on the AI/ML model 332 performance. Further, in some embodiments, immediate performance feedback may be recorded into a model feedback log 338 by the AI/ML server process 336. In some embodiments, execution model failure is a reason for immediate feedback.

In some embodiments, the API 334 includes an interface to provide AI/ML model 332 feedback after an AI/ML model 332 execution response has been processed. This mechanism may be used to evaluate the performance of the AI/ML model 332 by enabling the API caller to provide feedback on the accuracy of the model results. For example, if the AI/ML model 332 provided an estimated time of arrival of 20 minutes, but the actual travel time was 24 minutes, that may be indicated. In some embodiments, the feedback interface includes the identifier of the initial request so that it can be used to associate the feedback with the request. Upon receiving a call into the feedback interface of API 334, the AI/ML server process 336 records the feedback in the model feedback log 338. In some embodiments, the data in this model feedback log 338 is provided to model performance monitoring 356 in the AI/ML development system 340. This log data is streamed to the AI/ML development system 340 in one embodiment. In some embodiments, the log data is provided upon request.

A number of the steps/features that may utilize the AI/ML process described herein include one or more of: determining a vehicle is receiving content while connected to a charging point, providing an alert when an adverse situation arises within a proximity threshold of the vehicle while an occupant is consuming the content, the adverse situation includes a probability greater than a threshold of one or more of damage to the vehicle occurring or an attempted entry into the vehicle, the alert pauses the content being consumed, providing a notification to one or more of an individual or an entity when the adverse situation arises, providing the alert to other vehicles within a perimeter threshold of the vehicle while connected to a further charging point, the content is received on one or more of a device associated with the occupant or a display in the vehicle, the alert is increased in intensity based on a level of the adverse situation.

Data associated with any of these steps/features, as well as any other features or functionality described or depicted herein, the AI/ML production system 330, as well as one or more of the other elements depicted in FIG. 3C may be used to process this data in a pre-transformation and/or post-transformation process. Data related to this process can be used by the vehicle node 310. In one embodiment, data related to this process may be used with a charging station/charging point, a server, a wireless device, and/or any of the processors described or depicted herein.

Figure 3D:
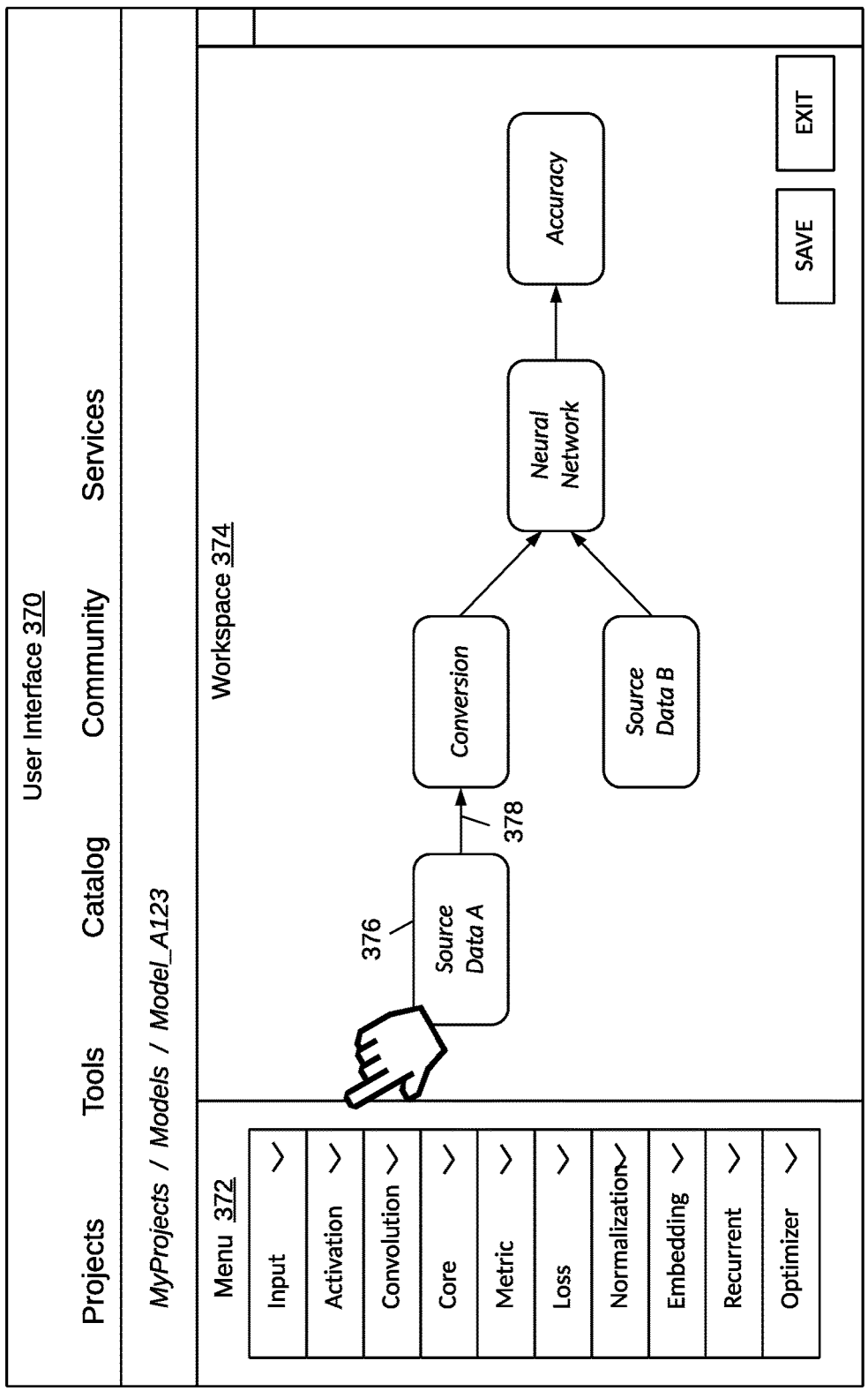
FIG. 3D illustrates a machine learning network diagram, according to example embodiments.

FIG. 3D illustrates a process 300D of designing a new machine learning model via a user interface 370 of the system according to example embodiments. As an example, a model may be output as part of the AI/ML Development System 340. Referring to FIG. 3D, a user can use an input mechanism from a menu 372 of a user interface 370 to add pieces/components to a model being developed within a workspace 374 of the user interface 370.

The menu 372 includes a plurality of graphical user interface (GUI) menu options which can be selected to reveal additional components that can be added to the model design shown in the workspace 374. The GUI menu includes options for adding elements to the workspace, such as features which may include neural networks, machine learning models, AI models, data sources, conversion processes (e.g., vectorization, encoding, etc.), analytics, etc. The user can continue to add features to the model and connect them using edges or other elements to create a flow within the workspace 374. For example, the user may add a node 376 to a flow of a new model within the workspace 374. For example, the user may connect the node 376 to another node in the diagram via an edge 378, creating a dependency within the diagram. When the user is done, the user can save the model for subsequent training/testing.

In another example, the name of the object can be identified from a web page or a user interface 370 where the object is visible within a browser or the workspace 374 on the user device. A pop-up within the browser or the workspace 374 can be overlayed where the object is visible, which includes an option to navigate to the identified web page corresponding to the alternative object via a rule set.

Figure 3E:
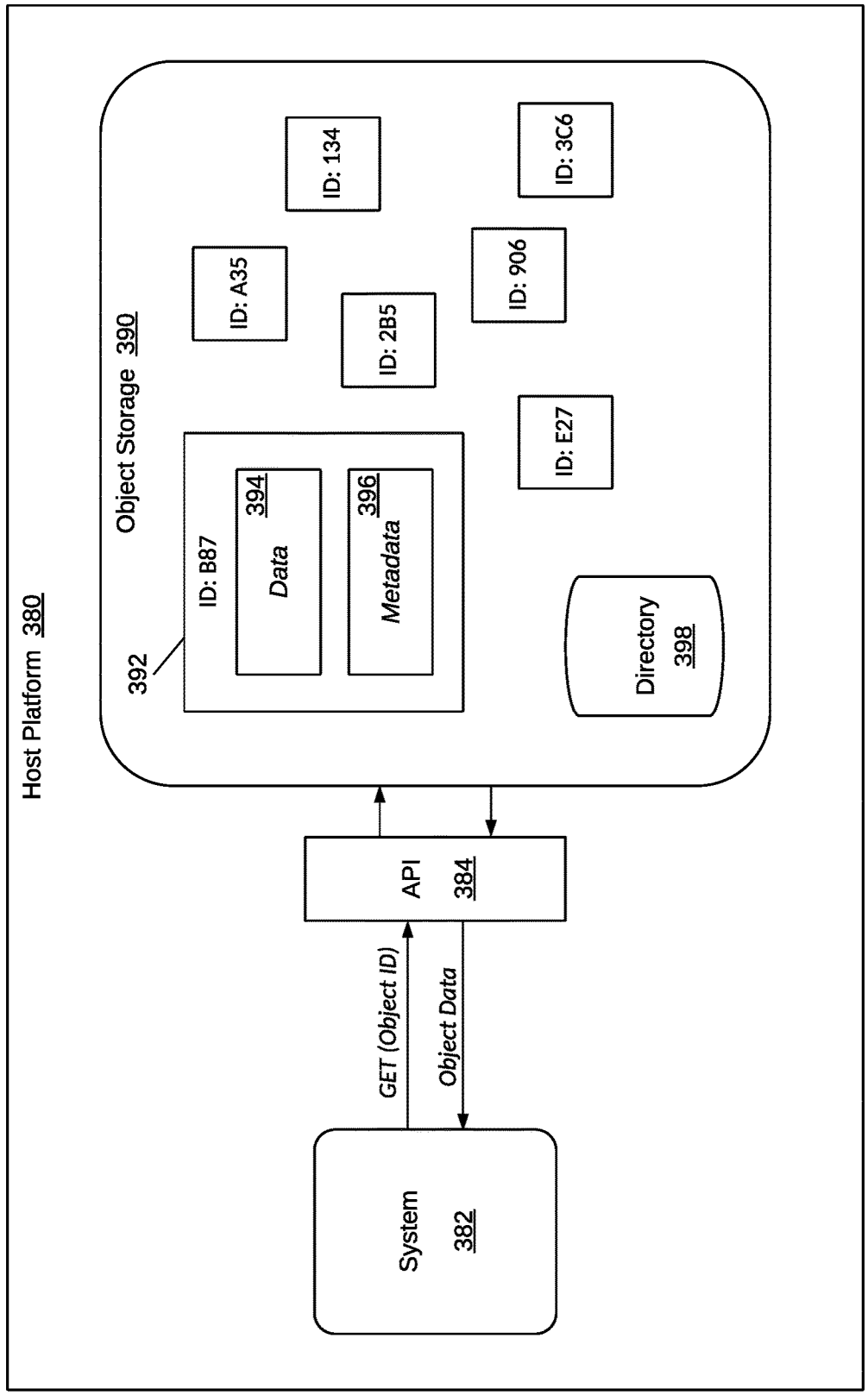
FIG. 3E illustrates a machine learning network diagram, according to example embodiments.

FIG. 3E illustrates a process 300E of accessing an object 392 from an object storage 390 of the host platform 380 according to example embodiments. For example, the object storage 390 may store data that is used by the AI models and machine learning (ML) models, training data, expected outputs for testing, training results, and the like. The object storage 390 may also store any other kind of data. Each object may include a unique identifier, a data section 394, and a metadata section 396, which provide a descriptive context associated with the data, including data that can later be extracted for purposes of machine learning. The unique identifier may uniquely identify an object with respect to all other objects in the object storage 390. The data section 394 may include unstructured data such as web pages, digital content, images, audio, text, and the like.

Instead of breaking files into blocks stored on disks in a file system, the object storage 390 handles objects as discrete units of data stored in a structurally flat data environment. Here, the object storage may not use folders, directories, or complex hierarchies. Instead, each object may be a simple, self-contained repository that includes the data, the metadata, and the unique identifier that a client application can use to locate and access it. In this case, the metadata is more descriptive than a file-based approach. The metadata can be customized with additional context that can later be extracted and leveraged for other purposes, such as data analytics.

The objects that are stored in the object storage 390 may be accessed via an API 384. The API 384 may be a Hypertext Transfer Protocol (HTTP)-based RESTful API (also known as a RESTful Web service). The API 384 can be used by the client application to query an object's metadata to locate the desired object (data) via the Internet from anywhere on any device. The API 384 may use HTTP commands such as "PUT" or "POST" to upload an object, "GET" to retrieve an object, "DELETE" to remove an object, and the like.

The object storage 390 may provide a directory 398 that uses the metadata of the objects to locate appropriate data files. The directory 398 may contain descriptive information about each object stored in the object storage 390, such as a name, a unique identifier, a creation timestamp, a collection name, etc. To query the object within the object storage 390, the client application may submit a command, such as an HTTP command, with an identifier of the object 392, a payload, etc. The object storage 390 can store the actions and results described herein, including associating two or more lists of ranked assets with one another based on variables used by the two or more lists of ranked assets that have a correlation above a predetermined threshold.

Figure 4A:
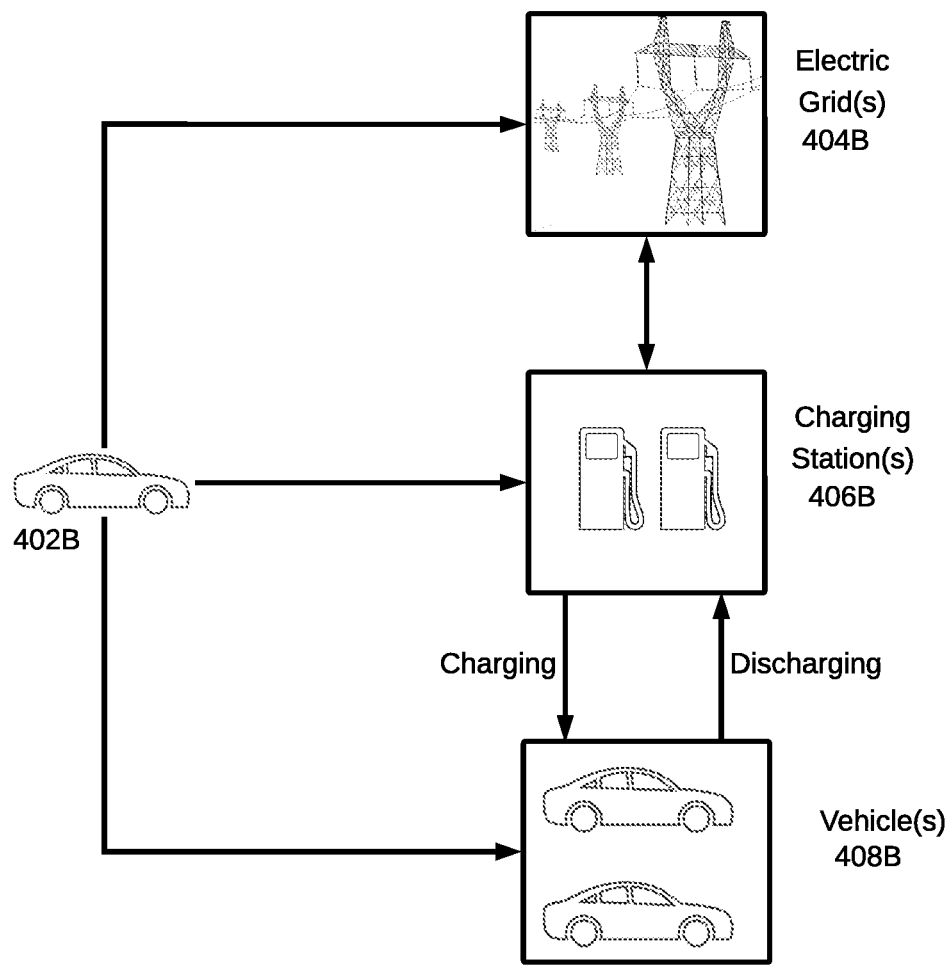
FIG. 4A illustrates a diagram depicting electrification of one or more elements, according to example embodiments.

FIG. 4A illustrates a diagram 400A depicting the electrification of one or more elements. In one example, a vehicle 402B may provide power stored in its batteries to one or more elements, including other vehicle(s) 408B, charging station(s) 406B, and electric grid(s) 404B. The electric grid(s) 404B is/are coupled to one or more of the charging stations 406B, which may be coupled to one or more of the vehicles 408B. This configuration allows the distribution of electricity/power received from the vehicle 402B. The vehicle 402B may also interact with the other vehicle(s) 408B, such as via V2V technology, communication over cellular, Wi-Fi, and the like. The vehicle 402B may also interact wirelessly and/or wired with other vehicles 408B, the charging station(s) 406B and/or with the electric grid(s) 404B. In one example, the vehicle 402B is routed (or routes itself) in a safe and efficient manner to the electric grid(s) 404B, the charging station(s) 406B, or the other vehicle(s) 408B. Using one or more embodiments of the instant solution, the vehicle 402B can provide energy to one or more of the elements depicted herein in various advantageous ways as described and/or depicted herein. Further, the safety and efficiency of the vehicle may be increased, and the environment may be positively affected as described and/or depicted herein. The term "charging station" herein may be referred to as a charging point, a charging bay, or a charging device and may refer to a device that is connected to a vehicle, such as through a charging port on the vehicle, where electricity is provided to the vehicle or received from the vehicle (Vehicle-to-Grid or V2G). It may also refer to a location connected to the charging port on the vehicle, such as an outlet or device at a home that provides electricity to charge the vehicle's battery.

The term 'energy', 'electricity', 'power', and the like may be used to denote any form of energy received, stored, used, shared, and/or lost by the vehicles(s). The energy may be referred to in conjunction with a voltage source and/or a current supply of charge provided from an entity to the vehicle(s) during a charge/use operation. Energy may also be in the form of fossil fuels (for example, for use with a hybrid vehicle) or via alternative power sources, including but not limited to lithium-based, nickel-based, hydrogen fuel cells, atomic/nuclear energy, fusion-based energy sources, and energy generated during an energy sharing and/or usage operation for increasing or decreasing one or more vehicles energy levels at a given time.

In one example, the charging station 406B manages the amount of energy transferred from the vehicle 402B such that there is sufficient charge remaining in the vehicle 402B to arrive at a destination. In one example, a wireless connection is used to wirelessly direct an amount of energy transfer between vehicles 408B, wherein the vehicles may both be in motion. In one embodiment, wireless charging may occur via a fixed charger and batteries of the vehicle in alignment with one another (such as a charging mat in a garage or parking space). In one example, an idle vehicle, such as a vehicle 402B (which may be autonomous) is directed to provide an amount of energy to a charging station 406B and return to the original location (for example, its original location or a different destination). In one example, a mobile energy storage unit (not shown) is used to collect surplus energy from at least one other vehicle 408B and transfer the stored surplus energy at a charging station 406B. In one example, factors determine an amount of energy to transfer to a charging station 406B, such as distance, time, as well as traffic conditions, road conditions, environmental/weather conditions, the vehicle's condition (weight, etc.), an occupant(s) schedule while utilizing the vehicle, a prospective occupant(s) schedule waiting for the vehicle, etc. In one example, the vehicle(s) 408B, the charging station(s) 406B and/or the electric grid(s) 404B can provide energy to the vehicle 402B.

In one embodiment, a location such as a building, a residence, or the like (not depicted), communicably coupled to one or more of the electric grid 404B, the vehicle 402B, and/or the charging station(s) 406B. The rate of electric flow to one or more of the location, the vehicle 402B, the other vehicle(s) 408B is modified, depending on external conditions, such as weather. For example, when the external temperature is extremely hot or extremely cold, raising the chance for an outage of electricity, the flow of electricity to a connected vehicle 402B/408B is slowed to help minimize the chance for an outage.

In one embodiment, vehicles 402B and 408B may be utilized as bidirectional vehicles. Bidirectional vehicles are those that may serve as mobile microgrids that can assist in the supplying of electrical power to the grid 404B and/or reduce the power consumption when the grid is stressed. Bidirectional vehicles incorporate bidirectional charging, which in addition to receiving a charge to the vehicle, the vehicle can transfer energy from the vehicle to the grid 404B, otherwise referred to as "V2G". In bidirectional charging, the electricity flows both ways; to the vehicle and from the vehicle. When a vehicle is charged, alternating current (AC) electricity from the grid 404B is converted to direct current (DC). This may be performed by one or more of the vehicle's own converter or a converter on the charging station 406B. The energy stored in the vehicle's batteries may be sent in an opposite direction back to the grid. The energy is converted from DC to AC through a converter usually located in the charging station 406B, otherwise referred to as a bidirectional charger. Further, the instant solution as described and depicted with respect to FIG. 4B can be utilized in this and other networks and/or systems.

Figure 4B:
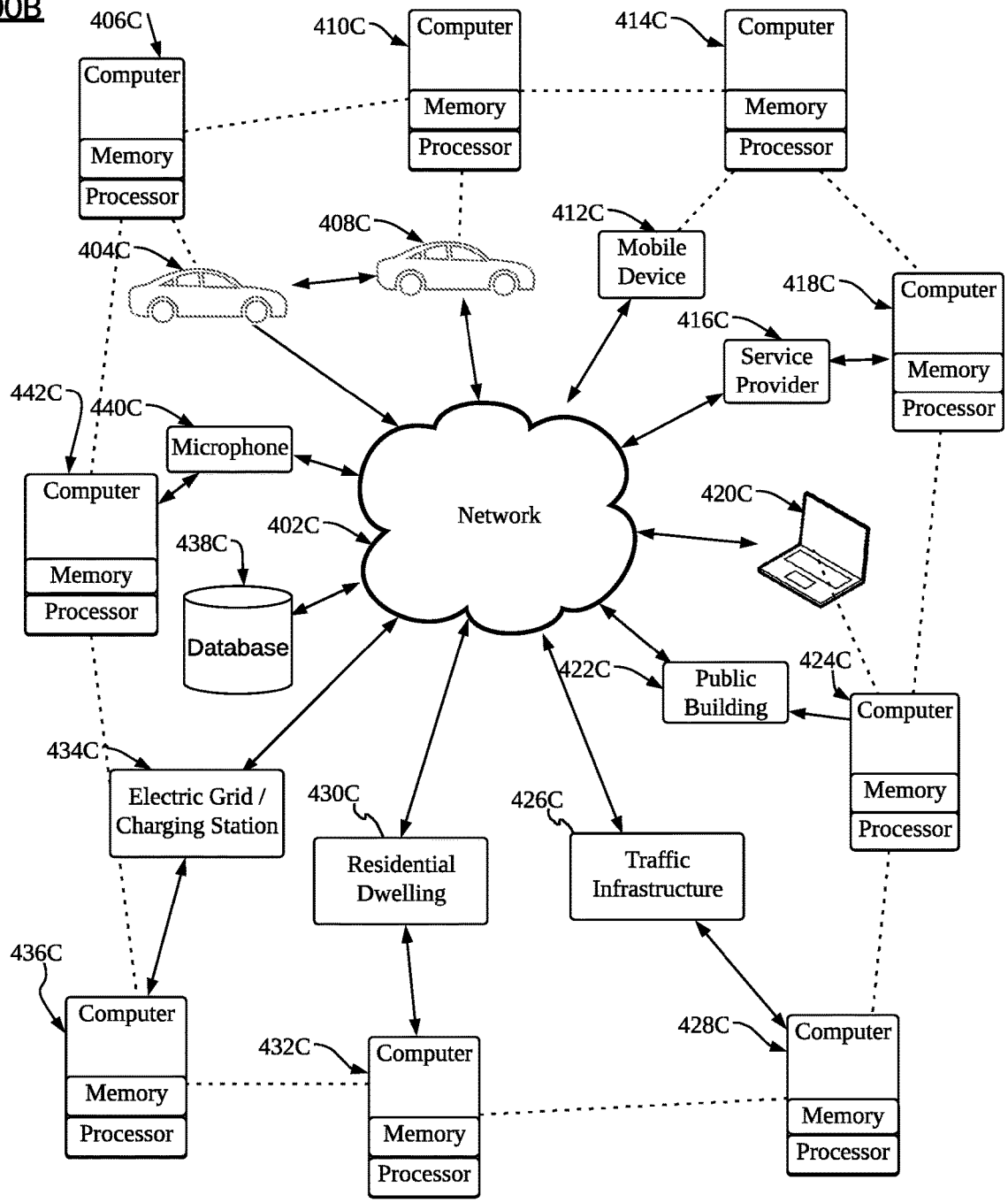
FIG. 4B illustrates a diagram depicting interconnections between different elements, according to example embodiments.

FIG. 4B is a diagram showing interconnections between different elements 400B. The instant solution may be stored and/or executed entirely or partially on and/or by one or more computing devices 414C, 418C, 424C, 428C, 432C, 436C, 406C, 442C and 410C associated with various entities, all communicably coupled and in communication with a network 402C. A database 438C is communicably coupled to the network and allows for the storage and retrieval of data. In one example, the database is an immutable ledger. One or more of the various entities may be a vehicle 404C, one or more service provider 416C, one or more public buildings 422C, one or more traffic infrastructure 426C, one or more residential dwellings 430C, an electric grid/charging station 434C, a microphone 440C, and/or another vehicle 408C. Other entities and/or devices, such as one or more private users using a smartphone 412C, a laptop 420C, an augmented reality (AR) device, a virtual reality (VR) device, and/or any wearable device may also interwork with the instant solution. The smartphone 412C, laptop 420C, the microphone 440C, and other devices may be connected to one or more of the connected computing devices 414C, 418C, 424C, 428C, 432C, 436C, 406C, 442C, and 410C. The one or more public buildings 422C may include various agencies. The one or more public buildings 422C may utilize a computing device 424C. The one or more service provider 416C may include a dealership, a tow truck service, a collision center, or other repair shop. The one or more service provider 416C may utilize a computing apparatus 418C. These various computer devices may be directly and/or communicably coupled to one another, such as via wired networks, wireless networks, blockchain networks, and the like. The microphone 440C may be utilized as a virtual assistant, in one example. In one example, the one or more traffic infrastructure 426C may include one or more traffic signals, one or more sensors including one or more cameras, vehicle speed sensors or traffic sensors, and/or other traffic infrastructure. The one or more traffic infrastructure 426C may utilize a computing device 428C.

In one embodiment, anytime an electrical charge is given or received to/from a charging station and/or an electrical grid, the entities that allow for that to occur are one or more of a vehicle, a charging station, a server, and a network communicably coupled to the vehicle, the charging station, and the electrical grid.

In one example, a vehicle 408C/404C can transport a person, an object, a permanently or temporarily affixed apparatus, and the like. In one example, the vehicle 408C may communicate with vehicle 404C via V2V communication through the computers associated with each vehicle 406C and 410C and may be referred to as a car, vehicle, automobile, and the like. The vehicle 404C/408C may be a self-propelled wheeled conveyance, such as a car, a sports utility vehicle, a truck, a bus, a van, or other motor or battery-driven or fuel cell-driven vehicle. For example, vehicle 404C/408C may be an electric vehicle, a hybrid vehicle, a hydrogen fuel cell vehicle, a plug-in hybrid vehicle, or any other type of vehicle with a fuel cell stack, a motor, and/or a generator. Other examples of vehicles include bicycles, scooters, trains, planes, boats, and any other form of conveyance that is capable of transportation. The vehicle 404C/408C may be semi-autonomous or autonomous. For example, vehicle 404C/408C may be self-maneuvering and navigate without human input. An autonomous vehicle may have and use one or more sensors and/or a navigation unit to drive autonomously. All of the data described or depicted herein can be stored, analyzed, processed and/or forwarded by one or more of the elements in FIG. 4B.

Figure 4C:
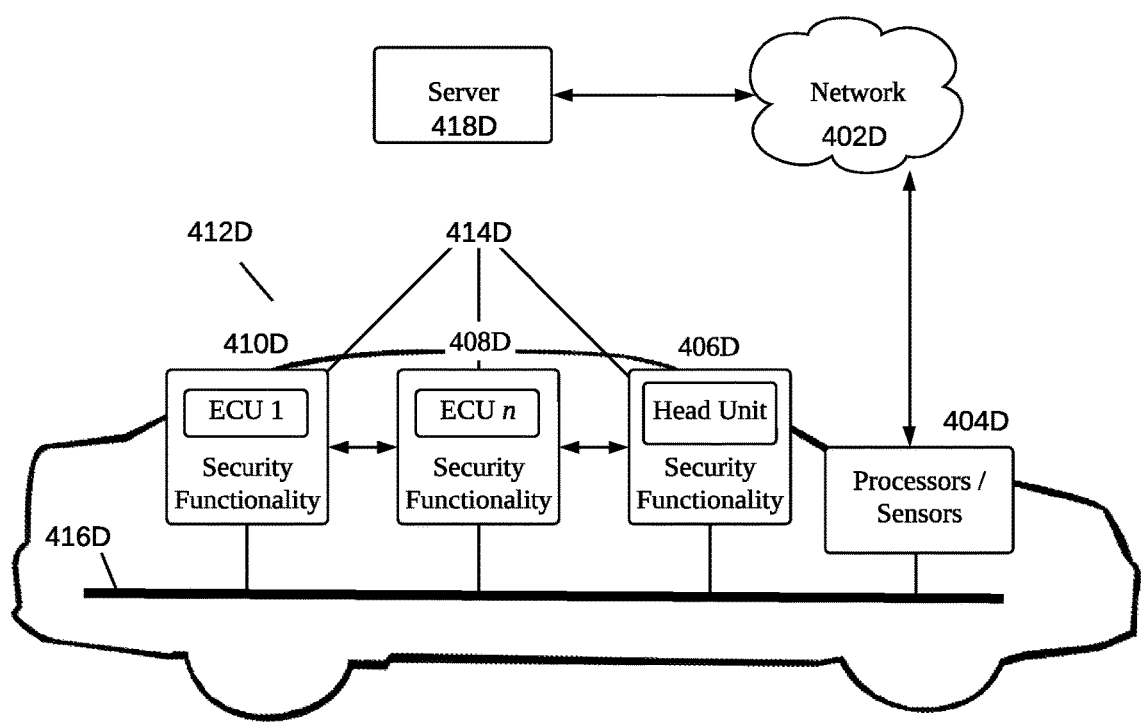
FIG. 4C illustrates a further diagram depicting interconnections between different elements, according to example embodiments.

FIG. 4C is another block diagram showing interconnections between different elements in one example 400C. A vehicle 412D is presented and includes ECUs 410D, 408D, and a Head Unit (otherwise known as an Infotainment System) 406D. An ECU is an embedded system in automotive electronics controlling one or more of the electrical systems or subsystems in a vehicle. ECUs may include but are not limited to the management of a vehicle's engine, brake system, gearbox system, door locks, dashboard, airbag system, infotainment system, electronic differential, and active suspension. ECUs are connected to the vehicle's Controller Area Network (CAN) bus 416D. The ECUs may also communicate with a vehicle computer 404D via the CAN bus 416D. The vehicle's processors/sensors (such as the vehicle computer) 404D can communicate with external elements, such as a server 418D via a network 402D (such as the Internet). Each ECU 410D, 408D, and Head Unit 406D may contain its own security policy. The security policy defines permissible processes that can be executed in the proper context. In one example, the security policy may be partially or entirely provided in the vehicle computer 404D.

ECUs 410D, 408D, and Head Unit 406D may each include a custom security functionality element 414D defining authorized processes and contexts within which those processes are permitted to run. Context-based authorization to determine validity if a process can be executed allows ECUs to maintain secure operation and prevent unauthorized access from elements such as the vehicle's CAN Bus. When an ECU encounters a process that is unauthorized, that ECU can block the process from operating. Automotive ECUs can use different contexts to determine whether a process is operating within its permitted bounds, such as proximity contexts, nearby objects, distance to approaching objects, speed, and trajectory relative to other moving objects, and operational contexts such as an indication of whether the vehicle is moving or parked, the vehicle's current speed, the transmission state, user-related contexts such as devices connected to the transport via wireless protocols, use of the infotainment, cruise control, parking assist, driving assist, location-based contexts, and/or other contexts.

Figure 4D:
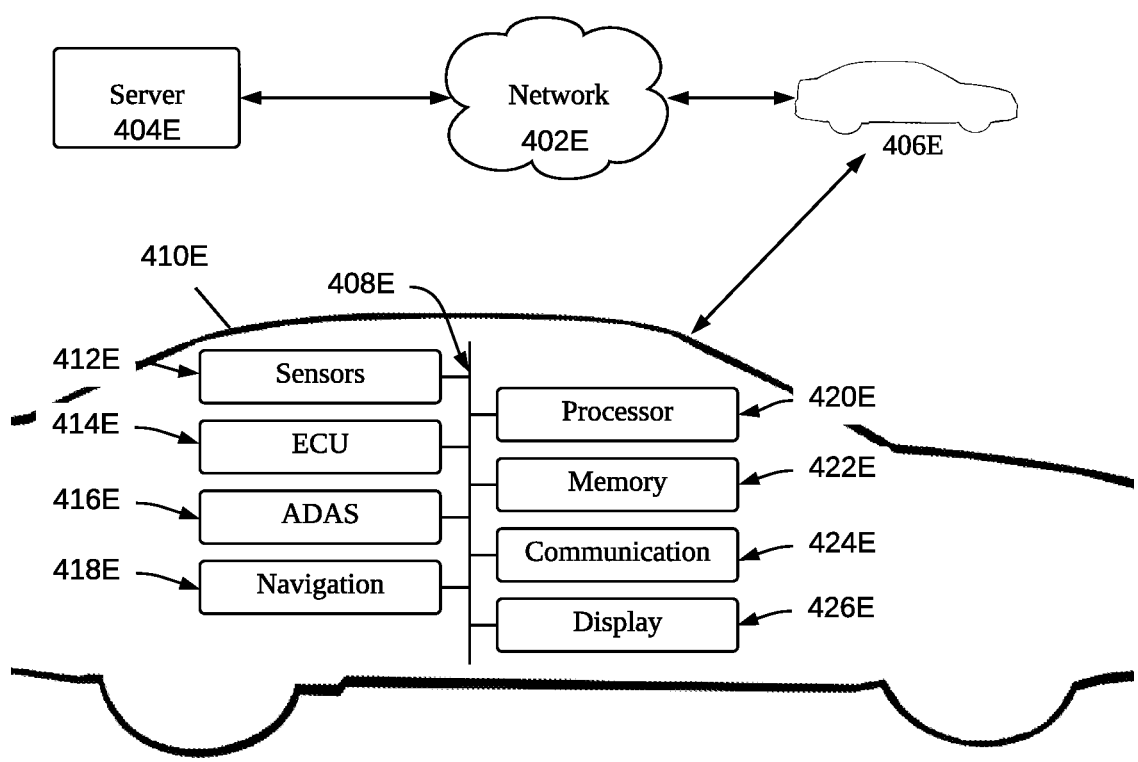
FIG. 4D illustrates yet a further diagram depicting interconnections between elements, according to example embodiments.

Referring to FIG. 4D, an operating environment 400D for a connected vehicle, is illustrated according to some embodiments. As depicted, the vehicle 410E includes a CAN bus 408E connecting elements 412E-426E of the vehicle. Other elements may be connected to the CAN bus and are not depicted herein. The depicted elements connected to the CAN bus include a sensor set 412E, Electronic Control Units 414E, autonomous features or Advanced Driver Assistance Systems (ADAS) 416E, and the navigation system 418E. In some embodiments, the vehicle 410E includes a processor 420E, a memory 422E, a communication unit 424E, and an electronic display 426E.

The processor 420E includes an arithmetic logic unit, a microprocessor, a general-purpose controller, and/or a similar processor array to perform computations and provide electronic display signals to a display unit 426E. The processor 420E processes data signals and may include various computing architectures, including a complex instruction set computer (CISC) architecture, a reduced instruction set computer (RISC) architecture, or an architecture implementing a combination of instruction sets. The vehicle 410E may include one or more processors 420E. Other processors, operating systems, sensors, displays, and physical configurations that are communicably coupled to one another (not depicted) may be used with the instant solution.

Memory 422E is a non-transitory memory storing instructions or data that may be accessed and executed by the processor 420E. The instructions and/or data may include code to perform the techniques described herein. The memory 422E may be a dynamic random-access memory (DRAM) device, a static random-access memory (SRAM) device, flash memory, or another memory device. In some embodiments, the memory 422E also may include non-volatile memory or a similar permanent storage device and media, which may include a hard disk drive, a floppy disk drive, a compact disc read only memory (CD-ROM) device, a digital versatile disk read only memory (DVD-ROM) device, a digital versatile disk random access memory (DVD-RAM) device, a digital versatile disk rewritable (DVD-RW) device, a flash memory device, or some other mass storage device for storing information on a permanent basis. A portion of the memory 422E may be reserved for use as a buffer or virtual random-access memory (virtual RAM). The vehicle 410E may include one or more memories 422E without deviating from the current solution.

The memory 422E of the vehicle 410E may store one or more of the following types of data: navigation route data 418E, and autonomous features data 416E. In some embodiments, the memory 422E stores data that may be necessary for the navigation application 418E to provide the functions.

The navigation system 418E may describe at least one navigation route including a start point and an endpoint. In some embodiments, the navigation system 418E of the vehicle 410E receives a request from a user for navigation routes wherein the request includes a starting point and an ending point. The navigation system 418E may query a real-time data server 404E (via a network 402E), such as a server that provides driving directions, for navigation route data corresponding to navigation routes, including the start point and the endpoint. The real-time data server 404E transmits the navigation route data to the vehicle 410E via a wireless network 402E, and the communication system 424E stores the navigation data 418E in the memory 422E of the vehicle 410E.

The ECU 414E controls the operation of many of the systems of the vehicle 410E, including the ADAS systems 416E. The ECU 414E may, responsive to instructions received from the navigation system 418E, deactivate any unsafe and/or unselected autonomous features for the duration of a journey controlled by the ADAS systems 416E. In this way, the navigation system 418E may control whether ADAS systems 416E are activated or enabled so that they may be activated for a given navigation route.

The sensor set 412E may include any sensors in the vehicle 410E generating sensor data. For example, the sensor set 412E may include short-range sensors and long-range sensors. In some embodiments, the sensor set 412E of the vehicle 410E may include one or more of the following vehicle sensors: a camera, a Light Detection and Ranging (Lidar) sensor, an ultrasonic sensor, an automobile engine sensor, a radar sensor, a laser altimeter, a manifold absolute pressure sensor, an infrared detector, a motion detector, a thermostat, a sound detector, a carbon monoxide sensor, a carbon dioxide sensor, an oxygen sensor, a mass airflow sensor, an engine coolant temperature sensor, a throttle position sensor, a crankshaft position sensor, a valve timer, an air-fuel ratio meter, a blind spot meter, a curb feeler, a defect detector, a Hall effect sensor, a parking sensor, a radar gun, a speedometer, a speed sensor, a tire-pressure monitoring sensor, a torque sensor, a transmission fluid temperature sensor, a turbine speed sensor (TSS), a variable reluctance sensor, a vehicle speed sensor (VSS), a water sensor, a wheel speed sensor, a global positioning system (GPS) sensor, a mapping functionality, and any other type of automotive sensor. The navigation system 418E may store the sensor data in the memory 422E.

The communication unit 424E transmits and receives data to and from the network 402E or to another communication channel. In some embodiments, the communication unit 424E may include a dedicated short-range communication (DSRC) transceiver, a DSRC receiver, and other hardware or software necessary to make the vehicle 410E a DSRC-equipped device.

The vehicle 410E may interact with other vehicles 406E via V2V technology. V2V communication includes sensing radar information corresponding to relative distances to external objects, receiving GPS information of the vehicles, setting areas where the other vehicles 406E are located based on the sensed radar information, calculating probabilities that the GPS information of the object vehicles will be located at the set areas, and identifying vehicles and/or objects corresponding to the radar information and the GPS information of the object vehicles based on the calculated probabilities, in one example.

For a vehicle to be adequately secured, the vehicle must be protected from unauthorized physical access as well as unauthorized remote access (e.g., cyber-threats). To prevent unauthorized physical access, a vehicle is equipped with a secure access system such as a keyless entry in one example. Meanwhile, security protocols are added to a vehicle's computers and computer networks to facilitate secure remote communications to and from the vehicle in one example.

ECUs are nodes within a vehicle that control tasks such as activating the windshield wipers to tasks such as an anti-lock brake system. ECUs are often connected to one another through the vehicle's central network, which may be referred to as a controller area network (CAN). State-of-the-art features such as autonomous driving are strongly reliant on implementing new, complex ECUs such as ADAS, sensors, and the like. While these new technologies have helped improve the safety and driving experience of a vehicle, they have also increased the number of externally-communicating units inside of the vehicle, making them more vulnerable to attack. Below are some examples of protecting the vehicle from physical intrusion and remote intrusion.

In one embodiment, a CAN includes a CAN bus with a high and low terminal and a plurality of ECUs, which are connected to the CAN bus via wired connections. The CAN bus is designed to allow microcontrollers and devices to communicate with each other in an application without a host computer. The CAN bus implements a message-based protocol (i.e., ISO 11898 standards) that allows ECUs to send commands to one another at a root level. Meanwhile, the ECUs represent controllers for controlling electrical systems or subsystems within the vehicle. Examples of the electrical systems include power steering, anti-lock brakes, air-conditioning, tire pressure monitoring, cruise control, and many other features.

In this example, the ECU includes a transceiver and a microcontroller. The transceiver may be used to transmit and receive messages to and from the CAN bus. For example, the transceiver may convert the data from the microcontroller into a format of the CAN bus and also convert data from the CAN bus into a format for the microcontroller. Meanwhile, the microcontroller interprets the messages and also decides what messages to send using ECU software installed therein in one example.

To protect the CAN from cyber threats, various security protocols may be implemented. For example, sub-networks (e.g., sub-networks A and B, etc.) may be used to divide the CAN into smaller sub-CANs and limit an attacker's capabilities to access the vehicle remotely. In one embodiment, a firewall (or gateway, etc.) may be added to block messages from crossing the CAN bus across sub-networks. If an attacker gains access to one sub-network, the attacker will not have access to the entire network. To make sub-networks even more secure, the most critical ECUs are not placed on the same sub-network, in one example.

In addition to protecting a vehicle's internal network, vehicles may also be protected when communicating with external networks such as the Internet. One of the benefits of having a vehicle connection to a data source such as the Internet is that information from the vehicle can be sent through a network to remote locations for analysis. Examples of vehicle information include GPS, onboard diagnostics, tire pressure, and the like. These communication systems are often referred to as telematics because they involve the combination of telecommunications and informatics. Further, the instant solution as described and depicted can be utilized in this and other networks and/or systems, including those that are described and depicted herein.

Figure 4E:
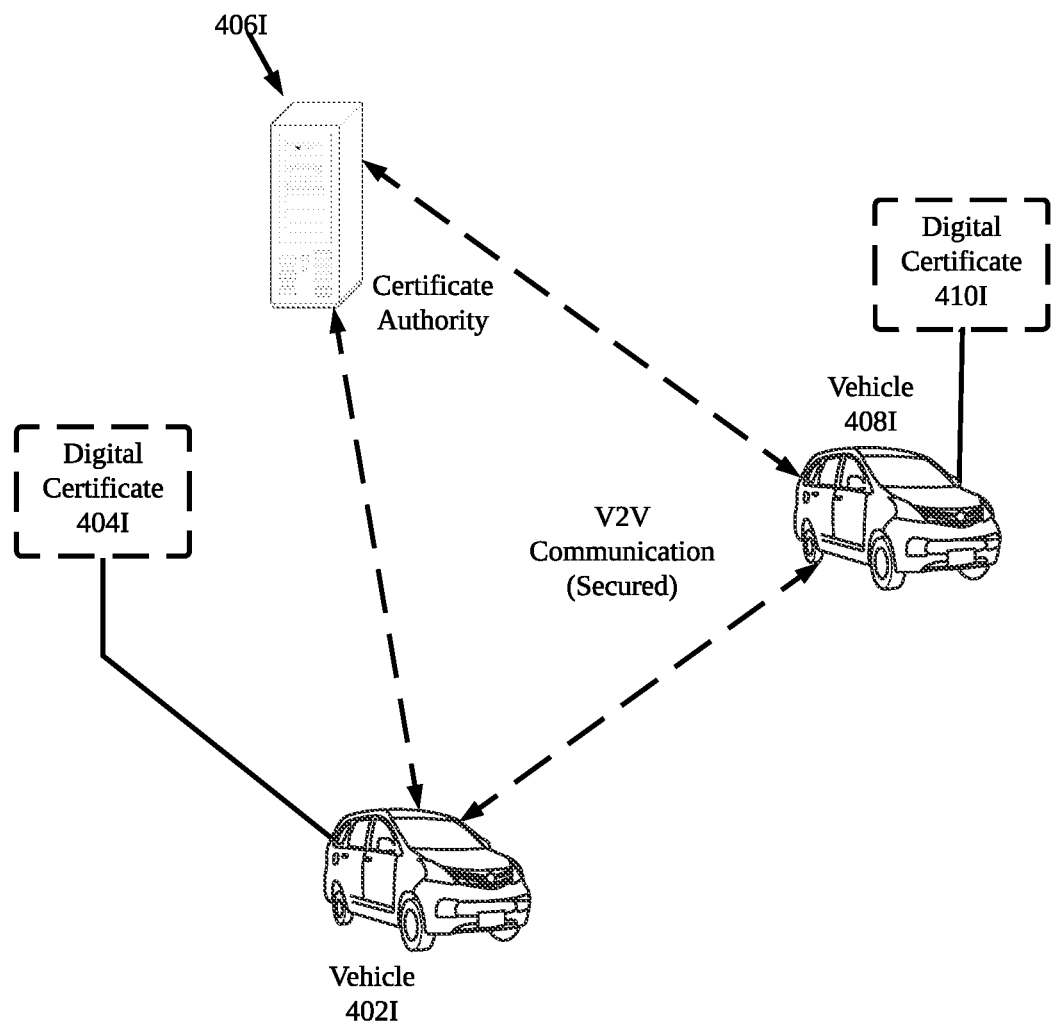
FIG. 4E illustrates yet a further diagram depicting an example of vehicles performing secured Vehicle-to-Vehicle (V2V) communications using security certificates, according to example embodiments.

FIG. 4E illustrates an example 400E of vehicles 402I and 408I performing secured V2V communications using security certificates, according to example embodiments. Referring to FIG. 4E, the vehicles 402I and 408I may communicate via V2V communications over a short-range network, a cellular network, or the like. Before sending messages, the vehicles 402I and 408I may sign the messages using a respective public key certificate. For example, the vehicle 402I may sign a V2V message using a public key certificate 404I. Likewise, the vehicle 408I may sign a V2V message using a public key certificate 410I. The public key certificates 404I and 410I are associated with the vehicles 402I and 408I, respectively, in one example.

Upon receiving the communications from each other, the vehicles may verify the signatures with a certificate authority 406I or the like. For example, the vehicle 408I may verify with the certificate authority 406I that the public key certificate 404I used by vehicle 402I to sign a V2V communication is authentic. If the vehicle 408I successfully verifies the public key certificate 404I, the vehicle knows that the data is from a legitimate source. Likewise, the vehicle 402I may verify with the certificate authority 406I that the public key certificate 410I used by the vehicle 408I to sign a V2V communication is authentic. Further, the instant solution as described and depicted with respect to FIG. 4E can be utilized in this and other networks and/or systems including those that are described and depicted herein.

In some embodiments, a computer may include a security processor. In particular, the security processor may perform authorization, authentication, cryptography (e.g., encryption), and the like, for data transmissions that are sent between ECUs and other devices on a CAN bus of a vehicle, and also data messages that are transmitted between different vehicles. The security processor may include an authorization module, an authentication module, and a cryptography module. The security processor may be implemented within the vehicle's computer and may communicate with other vehicle elements, for example, the ECUs/CAN network, wired and wireless devices such as wireless network interfaces, input ports, and the like. The security processor may ensure that data frames (e.g., CAN frames, etc.) that are transmitted internally within a vehicle (e.g., via the ECUs/CAN network) are secure. Likewise, the security processor can ensure that messages transmitted between different vehicles and devices attached or connected via a wire to the vehicle's computer are also secured.

For example, the authorization module may store passwords, usernames, PIN codes, biometric scans, and the like for different vehicle users. The authorization module may determine whether a user (or technician) has permission to access certain settings such as a vehicle's computer. In some embodiments, the authorization module may communicate with a network interface to download any necessary authorization information from an external server. When a user desires to make changes to the vehicle settings or modify technical details of the vehicle via a console or GUI within the vehicle or via an attached/connected device, the authorization module may require the user to verify themselves in some way before such settings are changed. For example, the authorization module may require a username, a password, a PIN code, a biometric scan, a predefined line drawing or gesture, and the like. In response, the authorization module may determine whether the user has the necessary permissions (access, etc.) being requested.

The authentication module may be used to authenticate internal communications between ECUs on the CAN network of the vehicle. As an example, the authentication module may provide information for authenticating communications between the ECUs. As an example, the authentication module may transmit a bit signature algorithm to the ECUs of the CAN network. The ECUs may use the bit signature algorithm to insert authentication bits into the CAN fields of the CAN frame. All ECUs on the CAN network typically receive each CAN frame. The bit signature algorithm may dynamically change the position, amount, etc., of authentication bits each time a new CAN frame is generated by one of the ECUs. The authentication module may also provide a list of ECUs that are exempt (safe list) and that do not need to use the authentication bits. The authentication module may communicate with a remote server to retrieve updates to the bit signature algorithm and the like.

The encryption module may store asymmetric key pairs to be used by the vehicle to communicate with other external user devices and vehicles. For example, the encryption module may provide a private key to be used by the vehicle to encrypt/decrypt communications, while the corresponding public key may be provided to other user devices and vehicles to enable the other devices to decrypt/encrypt the communications. The encryption module may communicate with a remote server to receive new keys, updates to keys, keys of new vehicles, users, etc., and the like. The encryption module may also transmit any updates to a local private/public key pair to the remote server.

Figure 5A:
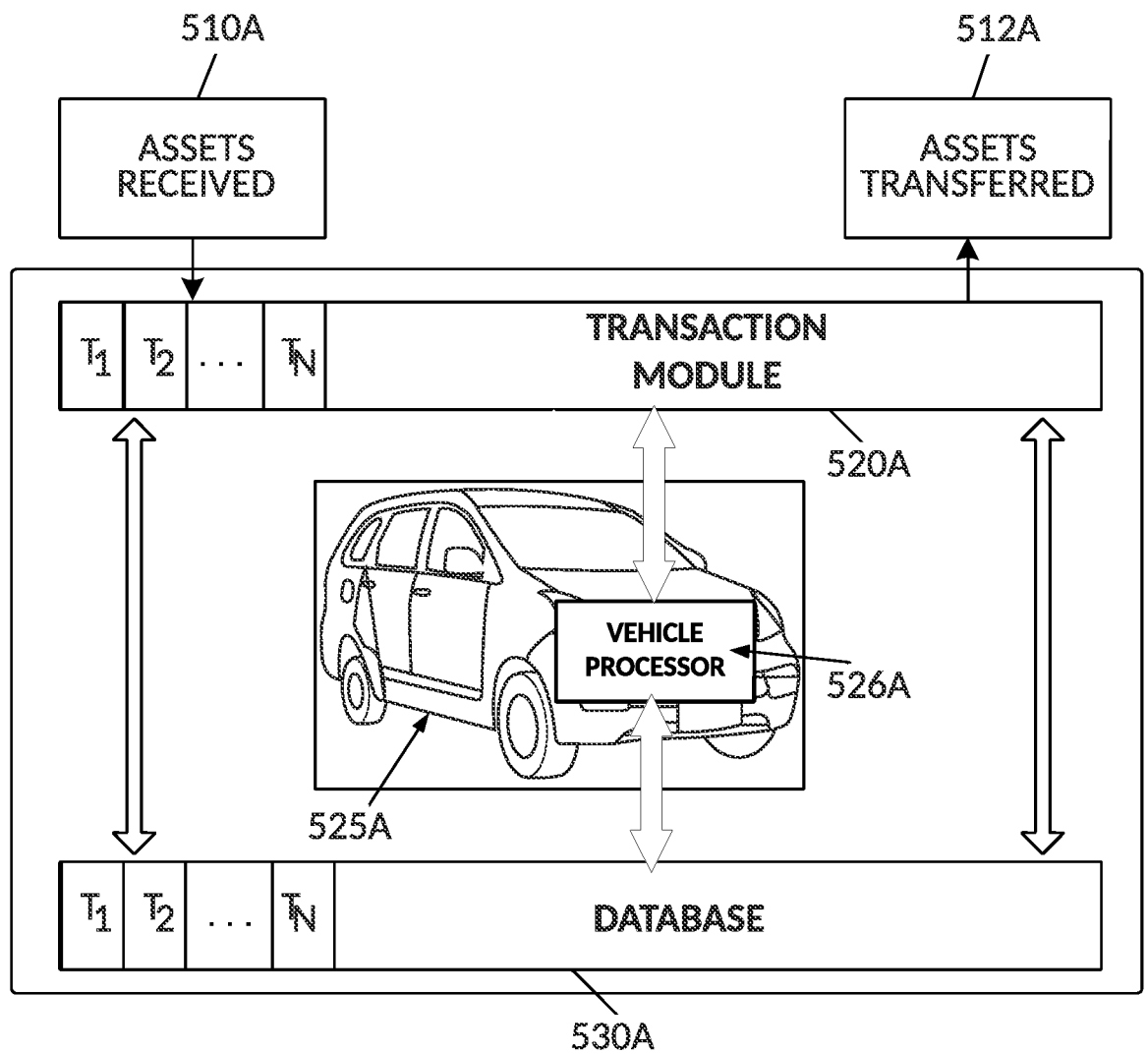
FIG. 5A illustrates an example vehicle configuration for managing database transactions associated with a vehicle, according to example embodiments.

FIG. 5A illustrates an example vehicle configuration 500A for managing database transactions associated with a vehicle, according to example embodiments. Referring to FIG. 5A, as a particular vehicle 525A is engaged in transactions (e.g., vehicle service, dealer transactions, delivery/pickup, transportation services, etc.), the vehicle may receive assets 510A and/or expel/transfer assets 512A according to a transaction(s). A vehicle processor 526A resides in the vehicle 525A and communication exists between the vehicle processor 526A, a database 530A, and the transaction module 520A. The transaction module 520A may record information, such as assets, parties, credits, service descriptions, date, time, location, results, notifications, unexpected events, etc. Those transactions in the transaction module 520A may be replicated into a database 530A. The database 530A can be one of a SQL database, a relational database management system (RDBMS), a relational database, a non-relational database, a blockchain, a distributed ledger, and may be on board the vehicle, may be off-board the vehicle, may be accessed directly and/or through a network, or be accessible to the vehicle.

In one embodiment, a vehicle may engage with another vehicle to perform various actions such as to share, transfer, acquire service calls, etc. when the vehicle has reached a status where the services need to be shared with another vehicle. For example, the vehicle may be due for a battery charge and/or may have an issue with a tire and may be in route to pick up a package for delivery. A vehicle processor resides in the vehicle and communication exists between the vehicle processor, a first database, and a transaction module. The vehicle may notify another vehicle, which is in its network and which operates on its blockchain member service. A vehicle processor resides in another vehicle and communication exists between the vehicle processor, a second database, the vehicle processor, and a transaction module. The another vehicle may then receive the information via a wireless communication request to perform the package pickup from the vehicle and/or from a server (not shown). The transactions are logged in the transaction modules and of both vehicles. The credits are transferred from the vehicle to the other vehicle and the record of the transferred service is logged in the first database, assuming that the blockchains are different from one another, or are logged in the same blockchain used by all members. The first database can be one of a SQL database, an RDBMS, a relational database, a non-relational database, a blockchain, a distributed ledger, and may be on board the vehicle, may be off-board the vehicle, may be accessible directly and/or through a network.

Figure 5B:
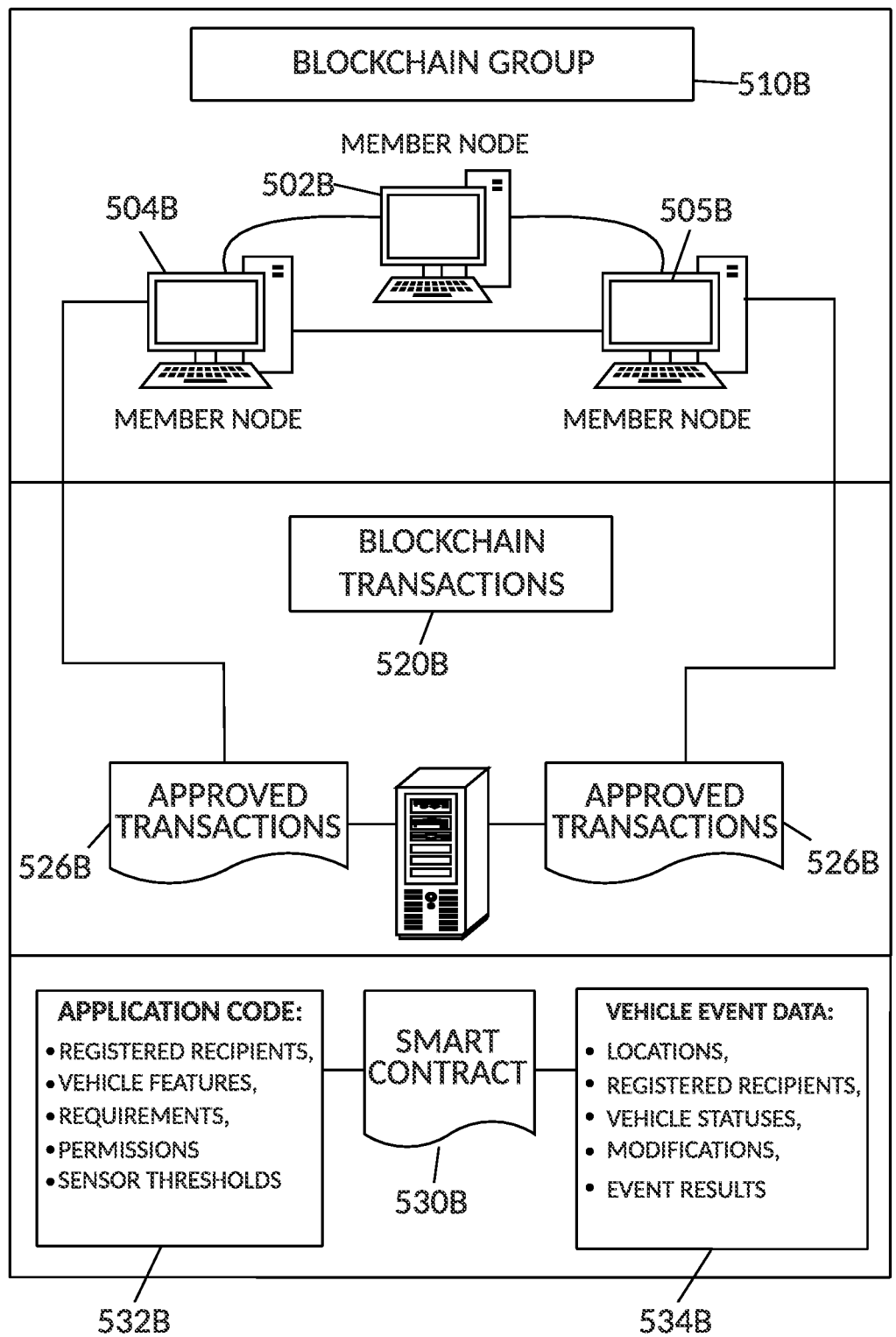
FIG. 5B illustrates an example blockchain group, according to example embodiments.

FIG. 5B illustrates a blockchain architecture configuration 500B, according to example embodiments. Referring to FIG. 5B, the blockchain architecture 500B may include certain blockchain elements, for example, a group of blockchain member nodes 502B-505B as part of a blockchain group 510B. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 520B are stored in memory of computers as the transactions are received and approved by the consensus model dictated by the members' nodes. Approved transactions 526B are stored in current blocks of the blockchain and committed to the blockchain via a committal procedure, which includes performing a hash of the data contents of the transactions in a current block and referencing a previous hash of a previous block. Within the blockchain, one or more smart contracts 530B may exist that define the terms of transaction agreements and actions included in smart contract executable application code 532B, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 534B, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 530B, which are then stored in a blockchain. For example, sensor thresholds stored in the smart contract can be used as the basis for whether a detected service is necessary and when and where the service should be performed.

In one embodiment, a blockchain logic example includes a blockchain application interface as an API or plug-in application that links to the computing device and execution platform for a particular transaction. The blockchain configuration may include one or more applications, which are linked to application programming interfaces (APIs) to access and execute stored program/application code (e.g., smart contract executable code, smart contracts, etc.), which can be created according to a customized configuration sought by participants and can maintain their own state, control their own assets, and receive external information. This can be deployed as an entry and installed, via appending to the distributed ledger, on all blockchain nodes.

The smart contract application code provides a basis for the blockchain transactions by establishing application code, which when executed causes the transaction terms and conditions to become active. The smart contract, when executed, causes certain approved transactions to be generated, which are then forwarded to the blockchain platform. The platform includes a security/authorization, computing devices, which execute the transaction management and a storage portion as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors, which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 5A and 5B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code that is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 5C:
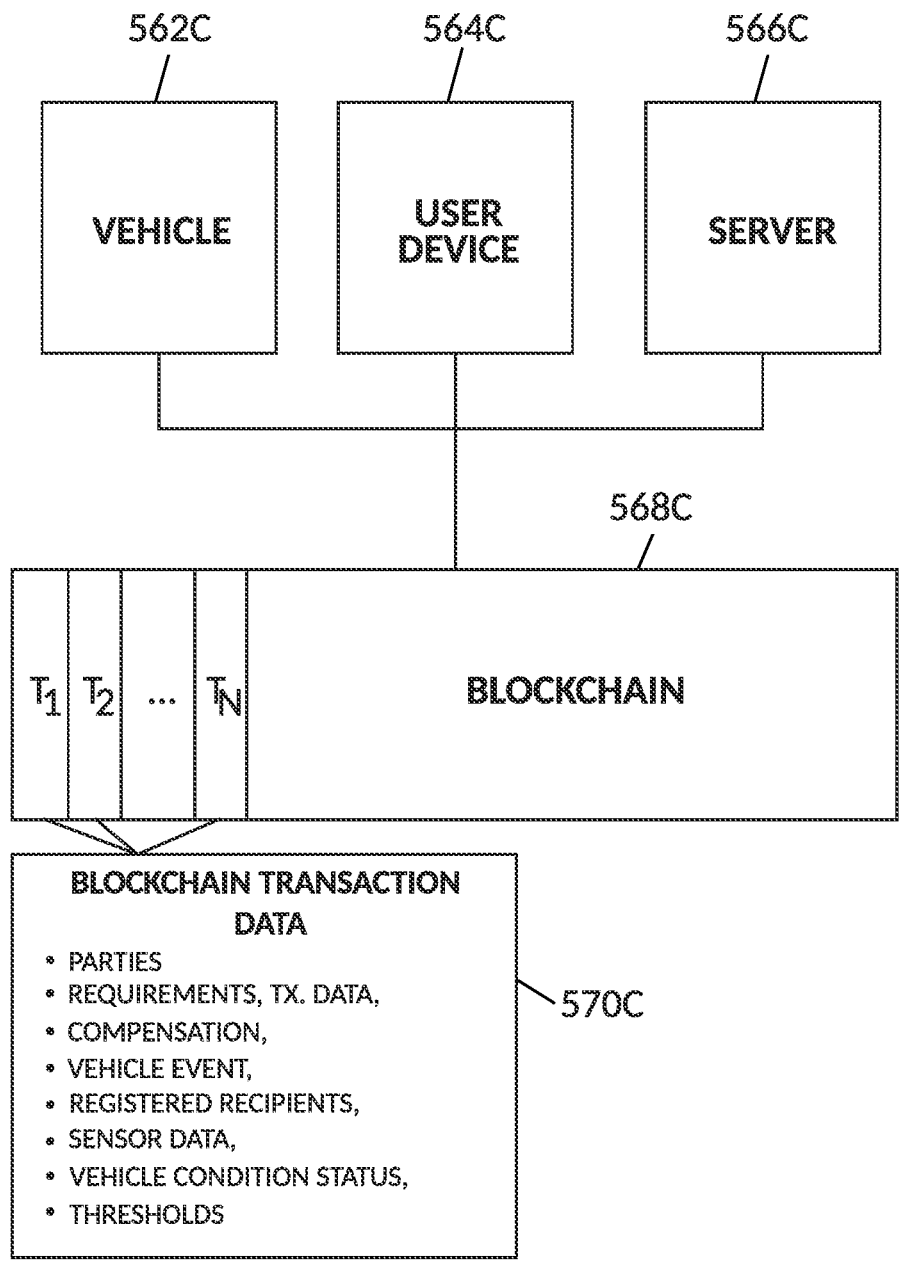
FIG. 5C illustrates an example interaction between elements and a blockchain, according to example embodiments.

FIG. 5C illustrates a blockchain configuration for storing blockchain transaction data, according to example embodiments. Referring to FIG. 5C, the example configuration 500C provides for the vehicle 562C, the user device 564C and a server 566C sharing information with a distributed ledger (i.e., blockchain) 568C. The server may represent a service provider entity inquiring with a vehicle service provider to share user profile rating information in the event that a known and established user profile is attempting to rent a vehicle with an established rated profile. The server 566C may be receiving and processing data related to a vehicle's service requirements. As the service events occur, such as the vehicle sensor data indicates a need for fuel/ charge, a maintenance service, etc., a smart contract may be used to invoke rules, thresholds, sensor information gathering, etc., which may be used to invoke the vehicle service event. The blockchain transaction data 570C is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 5D:
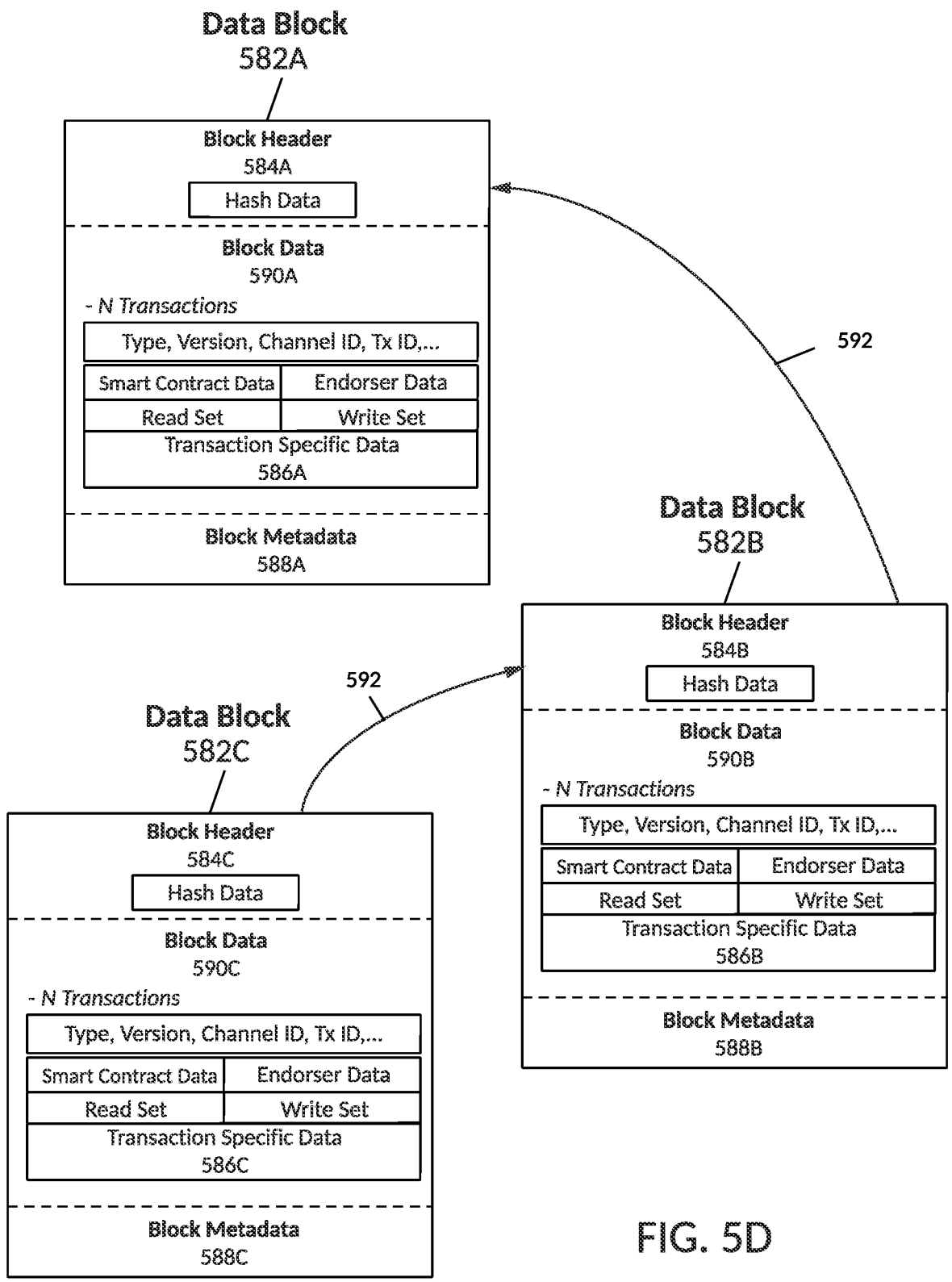
FIG. 5D illustrates an example data block interaction, according to example embodiments.

FIG. 5D illustrates blockchain blocks that can be added to a distributed ledger, according to example embodiments, and contents of block structures 582A to 582n. Referring to FIG. 5D, clients (not shown) may submit entries to blockchain nodes to enact activity on the blockchain. As an example, clients may be applications that act on behalf of a requester, such as a device, person, or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain that stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 5D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts, which simulate the entry proposals. When an endorsing node endorses an entry, the endorsing nodes creates an entry endorsement, which is a signed response from the endorsing node to the client application indicating the endorsement of the simulated entry. The method of endorsing an entry depends on an endorsement policy that may be specified within smart contract executable code. An example of an endorsement policy is "the majority of endorsing peers must endorse the entry." Different channels may have different endorsement policies. Endorsed entries are forwarded by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 582A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' becomes a pluggable component.

Entries are written to the distributed ledger in a consistent order. The order of entries is established to ensure that the updates to the state database are valid when they are committed to the network. Unlike a cryptocurrency blockchain system where ordering occurs through the solving of a cryptographic puzzle, or mining, in this example the parties of the distributed ledger may choose the ordering mechanism that best suits that network.

Referring to FIG. 5D, a block 582A (also referred to as a data block) that is stored on the blockchain and/or the distributed ledger may include multiple data segments such as a block header 584A to 584n, transaction-specific data 586A to 586n, and block metadata 588A to 588n. It should be appreciated that the various depicted blocks and their contents, such as block 582A and its contents are merely for purposes of an example and are not meant to limit the scope of the example embodiments. In some cases, both the block header 584A and the block metadata 588A may be smaller than the transaction-specific data 586A, which stores entry data; however, this is not a requirement. The block 582A may store transactional information of N entries (e.g., 100, 500, 1000, 2000, 3000, etc.) within the block data 590A to 590n. The block 582A may also include a link to a previous block (e.g., on the blockchain) within the block header 584A. In particular, the block header 584A may include a hash of a previous block's header. The block header 584A may also include a unique block number, a hash of the block data 590A of the current block 582A, and the like. The block number of the block 582A may be unique and assigned in an incremental/sequential order starting from zero. The first block in the blockchain may be referred to as a genesis block, which includes information about the blockchain, its members, the data stored therein, etc.

The block data 590A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 590A may also store transaction-specific data 586A, which adds additional information to the hash-linked chain of blocks in the blockchain. Accordingly, the data 586A can be stored in an immutable log of blocks on the distributed ledger. Some of the benefits of storing such data 586A are reflected in the various embodiments disclosed and depicted herein. The block metadata 588A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data and a validation code identifying whether an entry was valid/invalid.

The other blocks 582B to 582n in the blockchain also have headers, files, and values. However, unlike the first block 582A, each of the headers 584A to 584n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 592, to establish an auditable and immutable chain-of-custody.

Figure 5E:
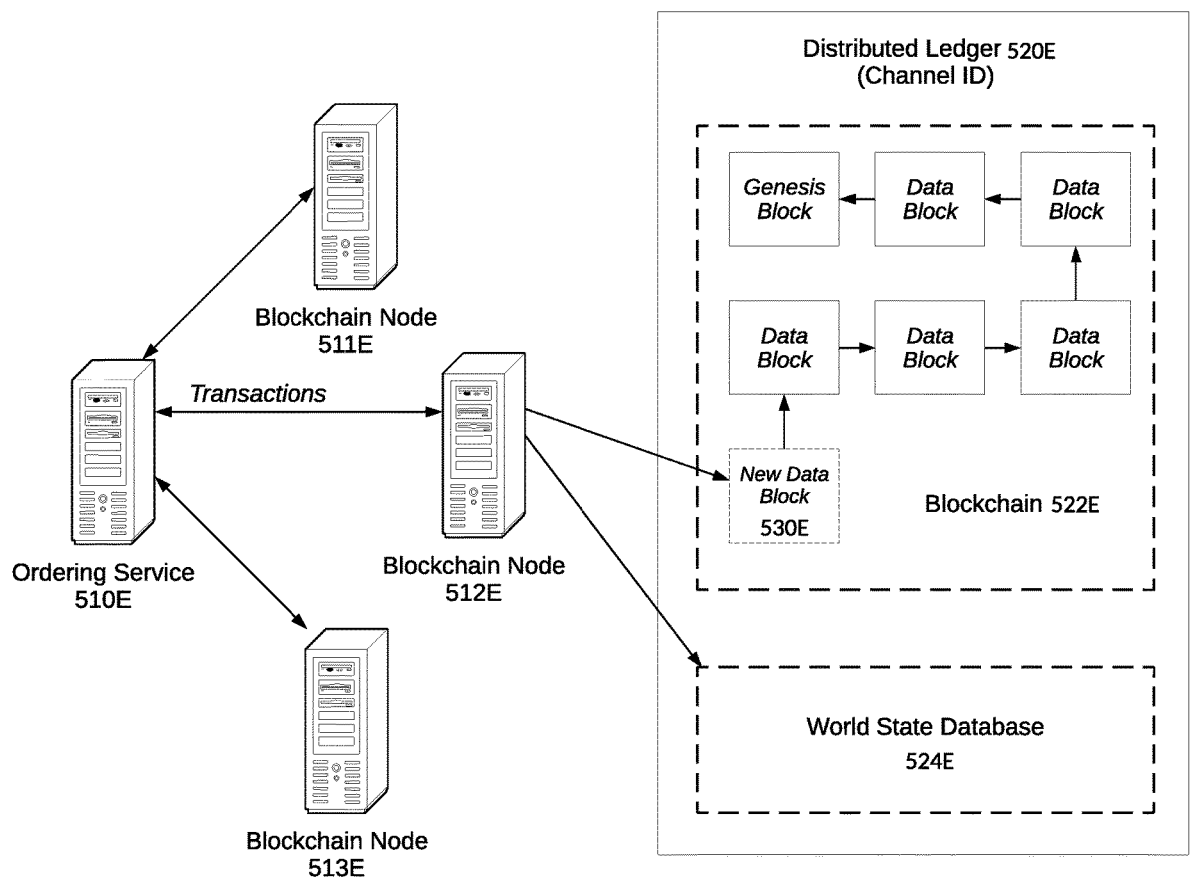
FIG. 5E illustrates a blockchain network diagram, according to example embodiments.

FIG. 5E illustrates a process 500E of a new block being added to a distributed ledger 520E, according to example embodiments, and FIG. 5D illustrates the contents of FIG. 5E's new data block structure 530E for blockchain, according to example embodiments. Referring to FIG. 5E, clients (not shown) may submit transactions to blockchain nodes 511E, 512E, and/or 513E. Clients may be instructions received from any source to enact activity on the blockchain 522E. As an example, clients may be applications that act on behalf of a requester, such as a device, person, or entity to propose transactions for the blockchain. The plurality of blockchain peers (e.g., blockchain nodes 511E, 512E, and 513E) may maintain a state of the blockchain network and a copy of the distributed ledger 520E. Different types of blockchain nodes/peers may be present in the blockchain network including endorsing peers which simulate and endorse transactions proposed by clients and committing peers which verify endorsements, validate transactions, and commit transactions to the distributed ledger 520E. In this example, the blockchain nodes 511E, 512E, and 513E may perform the role of endorser node, committer node, or both.

The distributed ledger 520E includes a blockchain which stores immutable, sequenced records in blocks, and a state database 524E (current world state) maintaining a current state of the blockchain 522E. One distributed ledger 520E may exist per channel and each peer maintains its own copy of the distributed ledger 520E for each channel of which they are a member. The blockchain 522E is a transaction log, structured as hash-linked blocks where each block contains a sequence of N transactions. The linking of the blocks (shown by arrows in FIG. 5E) may be generated by adding a hash of a prior block's header within a block header of a current block. In this way, all transactions on the blockchain 522E are sequenced and cryptographically linked together preventing tampering with blockchain data without breaking the hash links. Furthermore, because of the links, the latest block in the blockchain 522E represents every transaction that has come before it. The blockchain 522E may be stored on a peer file system (local or attached storage), which supports an append-only blockchain workload.

The current state of the blockchain 522E and the distributed ledger 520E may be stored in the state database 524E. Here, the current state data represents the latest values for all keys ever included in the chain transaction log of the blockchain 522E. Chaincode invocations execute transactions against the current state in the state database 524E. To make these chaincode interactions extremely efficient, the latest values of all keys are stored in the state database 524E. The state database 524E may include an indexed view into the transaction log of the blockchain 522E, and it can therefore be regenerated from the chain at any time. The state database 524E may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forwarded by the client application to the ordering service 510E.

The ordering service 510E accepts endorsed transactions, orders them into a block, and delivers the blocks to the committing peers. For example, the ordering service 510E may initiate a new block when a threshold of transactions has been reached, a timer times out, or another condition. In the example of FIG. 5E, blockchain node 512E is a committing peer that has received a new data block 530E for storage on blockchain 522E. The first block in the blockchain may be referred to as a genesis block which includes information about the blockchain, its members, the data stored therein, etc.

The ordering service 510E may be made up of a cluster of orderers. The ordering service 510E does not process transactions, smart contracts, or maintain the shared ledger. Rather, the ordering service 510E may accept the endorsed transactions and specifies the order in which those transactions are committed to the distributed ledger 522E. The architecture of the blockchain network may be designed such that the specific implementation of 'ordering' becomes a pluggable component.

Transactions are written to the distributed ledger 520E in a consistent order. The order of transactions is established to ensure that the updates to the state database 524E are valid when they are committed to the network. Unlike a cryptocurrency blockchain system where ordering occurs through the solving of a cryptographic puzzle, or mining, in this example the parties of the distributed ledger 520E may choose the ordering mechanism that best suits the network.

When the ordering service 510E initializes a new data block 530E, the new data block 530E may be broadcast to committing peers (e.g., blockchain nodes 511E, 512E, and 513E). In response, each committing peer validates the transaction within the new data block 530E by checking to make sure that the read set and the write set still match the current world state in the state database 524E. Specifically, the committing peer can determine whether the read data that existed when the endorsers simulated the transaction is identical to the current world state in the state database 524E. When the committing peer validates the transaction, the transaction is written to the blockchain 522E on the distributed ledger 520E, and the state database 524E is updated with the write data from the read-write set. If a transaction fails, that is, if the committing peer finds that the read-write set does not match the current world state in the state database 524E, the transaction ordered into a block will still be included in that block, but it will be marked as invalid, and the state database 524E will not be updated.

Figure 5F:
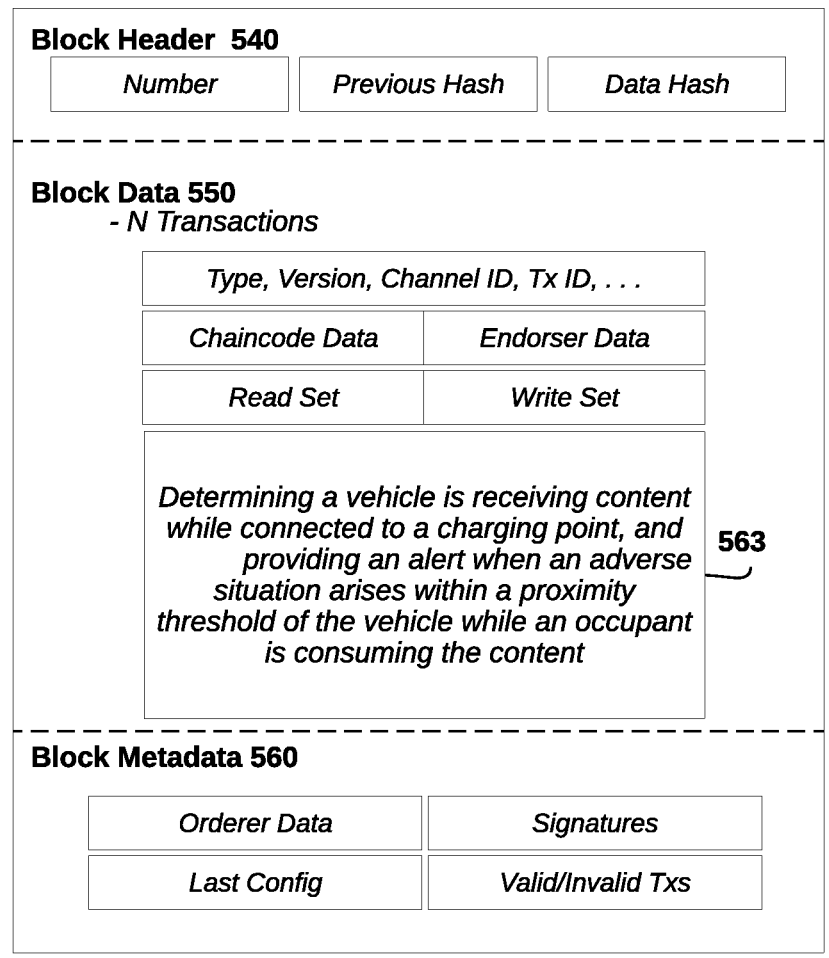
FIG. 5F illustrates an example new data block, according to example embodiments.

Referring to FIG. 5F 500F, a new data block 530 (also referred to as a data block) that is stored on the blockchain 522E of the distributed ledger 520E may include multiple data segments such as a block header 540, block data 550, and block metadata 560. It should be appreciated that the various depicted blocks and their contents, such as new data block 530 and its contents shown in FIG. 5F, are merely examples and are not meant to limit the scope of the example embodiments. The new data block 530 may store transactional information of N transaction(s) (e.g., 1, 10, 100, 500, 1000, 2000, 3000, etc.) within the block data 550. The new data block 530 may also include a link to a previous block (e.g., on the blockchain 522E in FIG. 5E) within the block header 540. In particular, the block header 540 may include a hash of a previous block's header. The block header 540 may also include a unique block number, a hash of the block data 550 of the new data block 530, and the like. The block number of the new data block 530 may be unique and assigned in various orders, such as an incremental/sequential order starting from zero.

The block data 550 may store transactional information of each transaction that is recorded within the new data block 530. For example, the transaction data may include one or more of a type of the transaction, a version, a timestamp, a channel ID of the distributed ledger 520E (shown in FIG. 5E), a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In one embodiment of the instant solution, the block data 563 may include data comprising one or more of determining a vehicle is receiving content while connected to a charging point, providing an alert when an adverse situation arises within a proximity threshold of the vehicle while an occupant is consuming the content, the adverse situation includes a probability greater than a threshold of one or more of damage to the vehicle occurring or an attempted entry into the vehicle, the alert pauses the content being consumed, providing a notification to one or more of an individual or an entity when the adverse situation arises, providing the alert to other vehicles within a perimeter threshold of the vehicle while connected to a further charging point, the content is received on one or more of a device associated with the occupant or a display in the vehicle, the alert is increased in intensity based on a level of the adverse situation. Although in FIG. 5F the blockchain data 563 is depicted in the block data 550 but may also be located in the block header 540 or the block metadata 560.

The block metadata 560 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 510E in FIG. 5E. Meanwhile, a committer of the block (such as blockchain node 512E in FIG. 5E) may add validity/invalidity information based on an endorsement policy, verification of read/write sets, and the like. The transaction filter may include a byte array of a size equal to the number of transactions in the block data and a validation code identifying whether a transaction was valid/invalid.

The above embodiments may be implemented in hardware, in a computer program executed by a processor, in firmware, or in a combination of the above. A computer program may be embodied on a computer-readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components. For example, FIG. 6 illustrates an example computing system architecture 600, which may represent or be integrated in any of the above-described components, etc.

Figure 6:
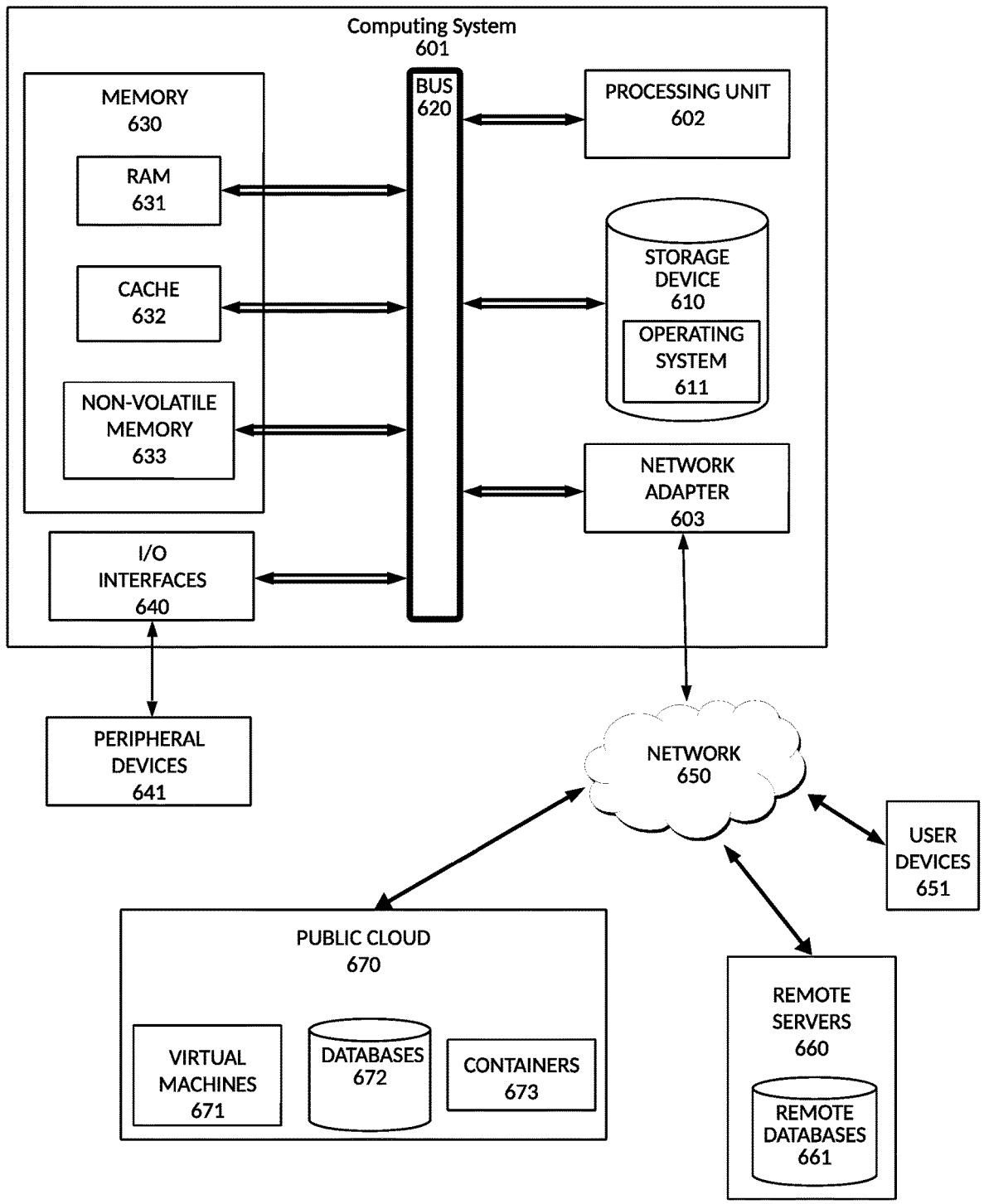
FIG. 6 illustrates an example system that supports one or more of the example embodiments.

FIG. 6 illustrates a computing environment according to example embodiments. FIG. 6 is not intended to suggest any limitation as to the scope of use or functionality of embodiments of the application described herein. Regardless, the computing environment 600 can be implemented to perform any of the functionalities described herein. In computer environment 600, computing system 601 is operational within numerous other general-purpose or special-purpose computing system environments or configurations.

Computing system 601 may take the form of a desktop computer, laptop computer, tablet computer, smartphone, smartwatch or other wearable computer, server computing system, thin client, thick client, network PC, minicomputing system, mainframe computer, quantum computer, and distributed cloud computing environment that include any of the described systems or devices, and the like or any other form of computer or mobile device now known or to be developed in the future that is capable of running a program, accessing a network 650 or querying a database. Depending upon the technology, the performance of a computer-implemented method may be distributed among multiple computers and between multiple locations. However, in this presentation of the computing environment 600, a detailed discussion is focused on a single computer, specifically computing system 601, to keep the presentation as simple as possible.

Computing system 601 may be located in a cloud, even though it is not shown in a cloud in FIG. 6. On the other hand, computing system 601 is not required to be in a cloud except to any extent as may be affirmatively indicated. Computing system 601 may be described in the general context of computing system-executable instructions, such as program modules, executed by a computing system 601. Generally, program modules may include routines, programs, objects, components, logic, data structures, and so on that perform tasks or implement certain abstract data types. As shown in FIG. 6, computing system 601 in computing environment 600 is shown in the form of a general-purpose computing device. The components of computing system 601 may include but are not limited to, one or more processors or processing units 602, a system memory 630, and a bus 620 that couples various system components, including system memory 630 to processing unit 602.

Processing unit 602 includes one or more computer processors of any type now known or to be developed. The processing unit 602 may contain circuitry distributed over multiple integrated circuit chips. The processing unit 602 may also implement multiple processor threads and multiple processor cores. Cache 632 is a memory that may be in the processor chip package(s) or located "off-chip," as depicted in FIG. 6. Cache 632 is typically used for data or code that the threads or cores running on the processing unit 602 should be available for rapid access. In some computing environments, processing unit 602 may be designed to work with qubits and perform quantum computing.

Network adapter 603 enables the computing system 601 to connect and communicate with one or more networks 650, such as a local area network (LAN), a wide area network (WAN), and/or a public network (e.g., the Internet). It bridges the computer's internal bus 620 and the external network, exchanging data efficiently and reliably. The network adapter 603 may include hardware, such as modems or Wi-Fi signal transceivers, and software for packetizing and/or de-packetizing data for communication network transmission. Network adapter 603 supports various communication protocols to ensure compatibility with network standards. For Ethernet connections, it adheres to protocols such as IEEE 802.3, while for wireless communications, it might support IEEE 802.11 standards, Bluetooth, near-field communication (NFC), or other network wireless radio standards.

Computing system 601 may include a removable/non-removable, volatile/non-volatile computer storage device 610. By way of example only, storage device 610 can be a non-removable, non-volatile magnetic media (not shown and typically called a "hard drive"). One or more data interfaces can connect it to the bus 620. In embodiments where computing system 601 is required to have a large amount of storage (for example, where computing system 601 locally stores and manages a large database), then this storage may be provided by storage devices 610 designed for storing very large amounts of data, such as a storage area network (SAN) that is shared by multiple, geographically distributed computers.

The operating system 611 is software that manages computing system 601 hardware resources and provides common services for computer programs. Operating system 611 may take several forms, such as various known proprietary operating systems or open-source Portable Operating System Interface type operating systems that employ a kernel.

The Bus 620 represents one or more of several types of bus structures, including a memory bus or memory controller, a peripheral bus, an accelerated graphics port, and a processor or local bus using various bus architectures. By way of example, and not limitation, such architectures include Industry Standard Architecture (ISA) buses, Micro Channel Architecture (MCA) buses, Enhanced ISA (EISA) buses, Video Electronics Standards Association (VESA) local buses, and Peripheral Component Interconnect (PCI) bus. The bus 620 is the signal conduction paths that allow the various components of computing system 601 to communicate with each other.

Memory 630 is any volatile memory now known or to be developed in the future. Examples include dynamic random-access memory (RAM 631) or static type RAM 631. Typically, the volatile memory is characterized by random access, but this is not required unless affirmatively indicated. In computing system 601, memory 630 is in a single package and is internal to computing system 601, but alternatively or additionally, the volatile memory may be distributed over multiple packages and/or located externally with respect to computing system 601. By way of example only, memory 630 can be provided for reading from and writing to a non-removable, non-volatile magnetic media (shown as storage device 610, and typically called a "hard drive"). Memory 630 may include at least one program product having a set (e.g., at least one) of program modules configured to carry out various functions. A typical computing system 601 may include cache 632, a specialized volatile memory generally faster than RAM 631 and generally located closer to the processing unit 602. Cache 632 stores frequently accessed data and instructions accessed by the processing unit 602 to speed up processing time. The computing system 601 may include non-volatile memory 633 in ROM, PROM, EEPROM, and flash memory. Non-volatile memory 633 often contains programming instructions for starting the computer, including the BIOS and information required to start the operating system 611.

Computing system 601 may also communicate with one or more peripheral devices 641 via an I/O interface 640. Such devices may include a keyboard, a pointing device, a display, etc.; one or more devices that enable a user to interact with computing system 601; and/or any devices (e.g., network card, modem, etc.) that enable computing system 601 to communicate with one or more other computing devices. Such communication can occur via input/output (I/O) interfaces 640. As depicted, I/O interface 640 communicates with the other components of computing system 601 via bus 620.

Network 650 is any computer network that can receive and/or transmit data. Network 650 can include a WAN, LAN, private cloud, or public Internet, capable of communicating computer data over non-local distances by any technology that is now known or to be developed in the future. Any connection depicted can be wired and/or wireless and may traverse other components that are not shown. In some embodiments, a network 650 may be replaced and/or supplemented by LANs designed to communicate data between devices located in a local area, such as a Wi-Fi network. The network 650 typically includes computer hardware such as copper transmission cables, optical transmission fibers, wireless transmission, routers, firewalls, switches, gateway computers, and edge servers. Computing system 601 connects to network 650 via network adapter 603 and bus 620.

User devices 651 are any computing systems used and controlled by an end user in connection with computing system 601. For example, in a hypothetical case where computing system 601 is designed to provide a recommendation to an end user, this recommendation may typically be communicated from network adapter 603 of computing system 601 through network 650 to a user device 651, allowing user device 651 to display, or otherwise present, the recommendation to an end user. User devices can be a wide array of devices, including PCs, laptops, tablet, hand-held, mobile phones, etc.

Remote servers 660 are any computers that serve at least some data and/or functionality over a network 650, for example, WAN, a virtual private network (VPN), a private cloud, or via the Internet to computing system 601. These networks 650 may communicate with a LAN to reach users. The user interface may include a web browser or an application that facilitates communication between the user and remote data. Such applications have been called "thin" desktops or "thin clients." Thin clients typically incorporate software programs to emulate desktop sessions. Mobile applications can also be used. Remote servers 660 can also host remote databases 661, with the database located on one remote server 660 or distributed across multiple remote servers 660. Remote databases 661 are accessible from database client applications installed locally on the remote server 660, other remote servers 660, user devices 651, or computing system 601 across a network 650.

A public cloud 670 is an on-demand availability of computing system resources, including data storage and computing power, without direct active management by the user. Public clouds 670 are often distributed, with data centers in multiple locations for availability and performance. Computing resources on public clouds (670) are shared across multiple tenants through virtual computing environments comprising virtual machines 671, databases 672, containers 673, and other resources. A container 673 is an isolated, lightweight software for running an application on the host operating system 611. Containers 673 are built on top of the host operating system's kernel and contain only applications and some lightweight operating system APIs and services. In contrast, virtual machine 671 is a software layer that includes a complete operating system 611 and kernel. Virtual machines 671 are built on top of a hypervisor emulation layer designed to abstract a host computer's hardware from the operating software environment. Public clouds 670 generally offer hosted databases 672 abstracting high-level database management activities. It should be further understood that one or more of the elements described or depicted in FIG. 6 can perform one or more of the actions, functionalities, or features described or depicted herein.

Although an exemplary embodiment of at least one of a system, method, and non-transitory computer-readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver, or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" may be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field-programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   determining a vehicle is receiving content while connected to a charging point;
   determining that an occupant of the vehicle is consuming the content;
   detecting an adverse situation exists within a proximity threshold of the vehicle;
   providing an alert in response to the determining the occupant is consuming the content and the detecting the adverse situation; and
   notifying at least one device external the vehicle based on the adverse situation.

2. The method of claim 1, wherein the adverse situation includes a probability greater than a threshold of one or more of damage to the vehicle occurring or an attempted entry into the vehicle.

3. The method of claim 1, wherein the alert pauses the content being consumed.

4. The method of claim 1, comprising providing a notification to one or more of an individual or an entity when the adverse situation arises.

5. The method of claim 1, wherein the content is received on one or more of a device associated with the occupant or a display in the vehicle.

6. The method of claim 1, wherein the alert is increased in intensity based on a level of the adverse situation.

7. A system, comprising:
   at least one processor in a vehicle; and
   a memory, wherein the at least one processor and the memory are communicably coupled, wherein the at least one processor:
   determines, by the vehicle, the vehicle receives content while connected to a charging point;
   determines that an occupant of the vehicle consumes the content;
   detects an adverse situation within a proximity threshold of the vehicle;
   provides, by the vehicle, an alert in response to the determining the occupant is consuming the content and the detecting the adverse situation; and
   notifies at least one device external the vehicle based on the adverse situation.

8. The system of claim 7, wherein the adverse situation includes a probability greater than a threshold of one or more damage to the vehicle occurring or an attempted entry into the vehicle.

9. The system of claim 7, wherein the alert pauses the content.

10. The system of claim 7, wherein the at least one processor provides a notification to one or more of an individual or an entity when the adverse situation arises.

11. The system of claim 7, wherein the content is received on one or more of a device associated with the occupant or a display in the vehicle.

12. The system of claim 7, wherein the alert is increased in intensity based on a level of the adverse situation.

13. A non-transitory computer-readable storage medium comprising instructions, that when read by a processor, cause the processor to perform:
   determining whether a vehicle is receiving content while connected to a charging point;
   determining that an occupant of the vehicle is consuming the content;
   detecting an adverse situation within a proximity threshold of the vehicle;
      providing an alert in response to the determining the occupant is consuming the content and the detecting the adverse situation; and
   notifying at least one device external the vehicle based on the adverse situation.

14. The non-transitory computer-readable storage medium of claim 13, wherein the adverse situation includes a probability greater than a threshold of one or more damage to the vehicle occurring or an attempted entry into the vehicle.

15. The non-transitory computer-readable storage medium of claim 13, wherein the alert pauses the content.

16. The non-transitory computer-readable storage medium of claim 13, wherein the processor performs providing a notification to one or more of an individual or an entity when the adverse situation arises.

17. The non-transitory computer-readable storage medium of claim 13, wherein the content is received on one or more of a device associated with the occupant or a display in the vehicle.

* * * * *